(12) United States Patent
Iwakoshi et al.

(10) Patent No.: US 10,877,417 B2
(45) Date of Patent: Dec. 29, 2020

(54) DETECTING APPARATUS AND IMAGE FORMING APPARATUS

(71) Applicant: CANON KABUSHIKI KAISHA, Tokyo (JP)

(72) Inventors: Tomoyuki Iwakoshi, Suntou-gun (JP); Satoshi Tsuda, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/853,901

(22) Filed: Apr. 21, 2020

(65) Prior Publication Data

US 2020/0249608 A1 Aug. 6, 2020

Related U.S. Application Data

(63) Continuation of application No. 16/121,860, filed on Sep. 5, 2018, now Pat. No. 10,671,005.

(30) Foreign Application Priority Data

Sep. 8, 2017 (JP) .................................. 2017-173126
Sep. 8, 2017 (JP) .................................. 2017-173139

(51) Int. Cl.
*G03G 15/00* (2006.01)
*G01J 3/02* (2006.01)
(Continued)

(52) U.S. Cl.
CPC ............ *G03G 15/5041* (2013.01); *B41J 2/01* (2013.01); *B41J 2/525* (2013.01); *G01J 3/0202* (2013.01);
(Continued)

(58) Field of Classification Search
CPC ........... G03G 15/5029; G03G 15/5062; G03G 21/14; G01J 3/46
See application file for complete search history.

(56) References Cited

U.S. PATENT DOCUMENTS

| 8,210,642 B2 | 7/2012 | Yamamoto |
| 2011/0026953 A1 | 2/2011 | Tomita |

(Continued)

FOREIGN PATENT DOCUMENTS

| JP | H08-286494 A | 11/1996 |
| JP | 2007-017507 A | 1/2007 |

(Continued)

OTHER PUBLICATIONS

Office Action in Japanese Patent Application No. 2017-173139, dated Jun. 18, 2019.

(Continued)

*Primary Examiner* — Gregory H Curran
(74) *Attorney, Agent, or Firm* — Venable LLP

(57) ABSTRACT

A detecting apparatus includes: a light emitting element which emits light toward a detection material; a light receiving element which receives reflected light from the detection material; and an apparatus main body having an opening/closing member which opens and closes an opening through which light emitted from the light emitting element and reflected light from the detection material pass through, the apparatus main body being capable of moving between a first position where the apparatus main body comes into contact with the detection material and a second position where the apparatus main body separates from the detection material, and the opening/closing member being configured to open when the apparatus main body moves to the first position and to close when the apparatus main body moves to the second position.

21 Claims, 24 Drawing Sheets

(51) Int. Cl.
*B41J 2/01* (2006.01)
*B41J 2/525* (2006.01)
*G01J 3/46* (2006.01)
*G03G 21/14* (2006.01)

(52) U.S. Cl.
CPC .......... *G01J 3/0205* (2013.01); *G01J 3/0256* (2013.01); *G01J 3/46* (2013.01); *G03G 15/5029* (2013.01); *G03G 15/5062* (2013.01); *G03G 21/14* (2013.01)

(56) References Cited

U.S. PATENT DOCUMENTS

| | | |
|---|---|---|
| 2013/0216244 A1 | 8/2013 | Miyazaki |
| 2013/0242319 A1 | 9/2013 | Suzuki et al. |
| 2014/0185047 A1 | 7/2014 | Tajima et al. |
| 2014/0199085 A1 | 7/2014 | Matsui et al. |
| 2014/0376932 A1 | 12/2014 | Koyama |
| 2016/0370230 A1 | 12/2016 | Nishimura |
| 2016/0379095 A1 | 12/2016 | Nozawa |

FOREIGN PATENT DOCUMENTS

| | | |
|---|---|---|
| JP | 2009-132026 A | 6/2009 |
| JP | 2010-047347 A | 3/2010 |
| JP | 2011-033893 A | 2/2011 |
| JP | 2011-169967 A | 9/2011 |
| JP | 2013-111785 A | 6/2013 |
| JP | 2013-130561 A | 7/2013 |
| JP | 2013-148503 A | 8/2013 |
| JP | 2013-205065 A | 10/2013 |
| JP | 2013-205258 A | 10/2013 |
| JP | 2013-208743 A | 10/2013 |
| JP | 2013-217905 A | 10/2013 |
| JP | 2014-040020 A | 3/2014 |
| JP | 2014-082679 A | 5/2014 |
| JP | 2014-137459 A | 7/2014 |
| JP | 2015-004811 A | 1/2015 |
| JP | 2015-215441 A | 12/2015 |
| JP | 2016-159525 A | 9/2016 |
| JP | 2017-009358 A | 1/2017 |
| JP | 2017-009461 A | 1/2017 |

OTHER PUBLICATIONS

Office Action in Japanese Patent Application No. 2017-173126, dated Jun. 18, 2019.

FIG.4A SEPARATION POSITION
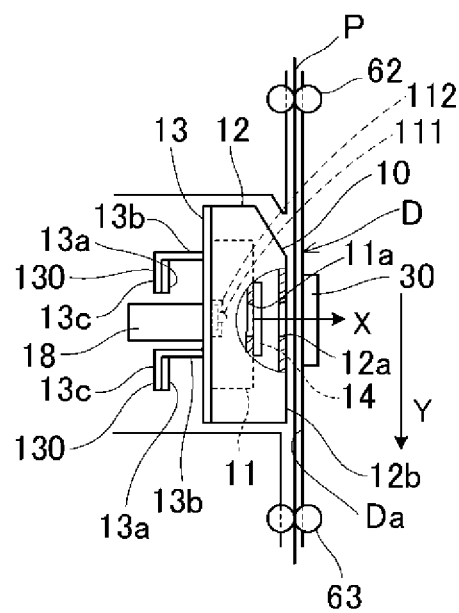
FIG.4B CONTACT POSITION
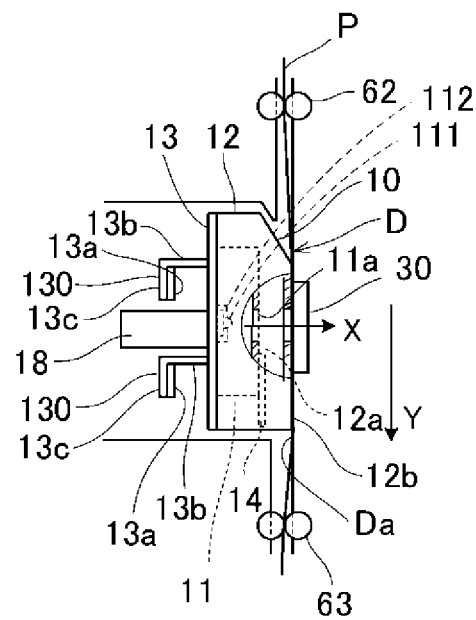
FIG.4C
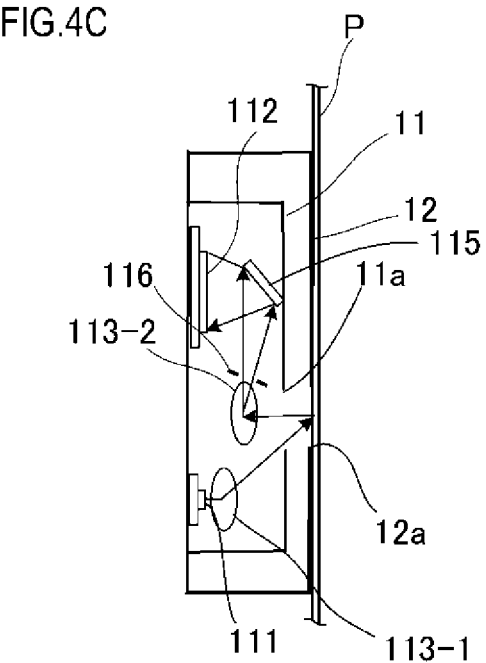

FIG.5A SEPARATION POSITION
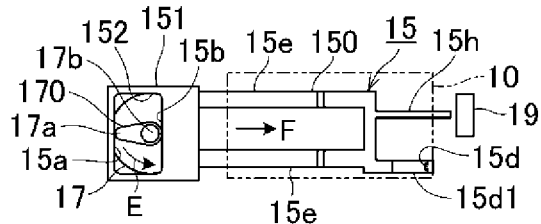
FIG.5B
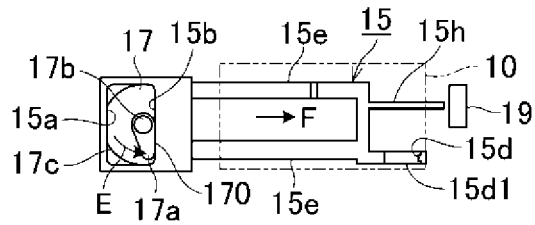
FIG.5C CONTACT POSITION
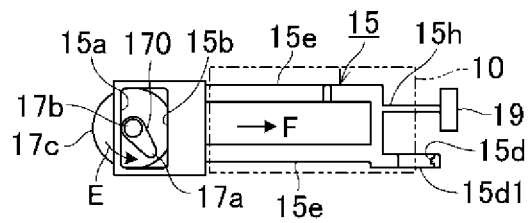
FIG.5D CONTACT POSITION
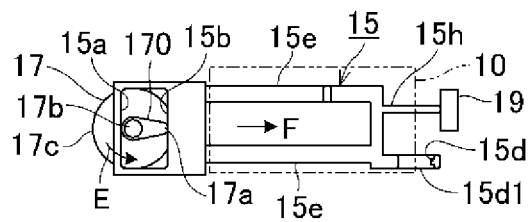
FIG.5E
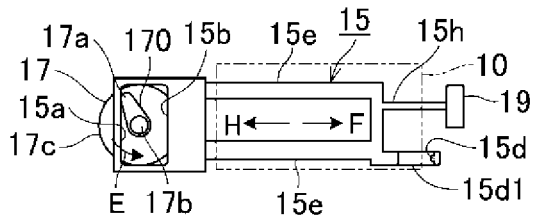
FIG.5F SEPARATION POSITION
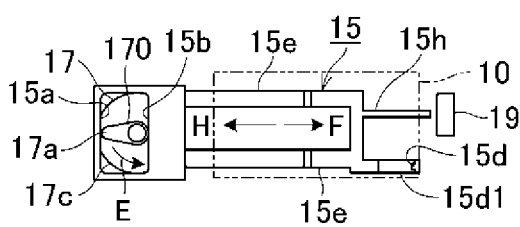

FIG.6A SEPARATION POSITION
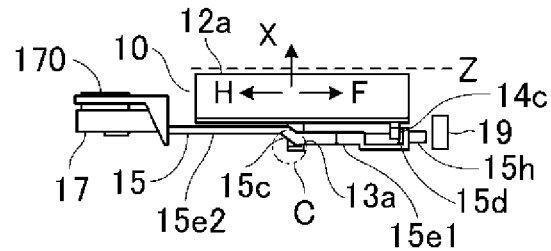
FIG.6B
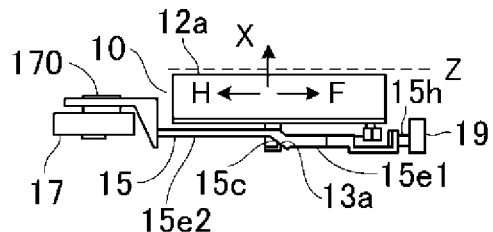
FIG.6C
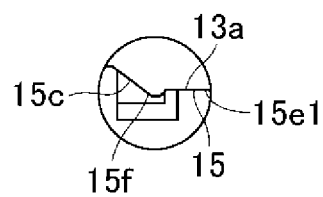
FIG.6D CONTACT POSITION
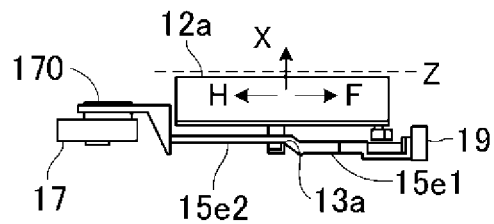
FIG.6E
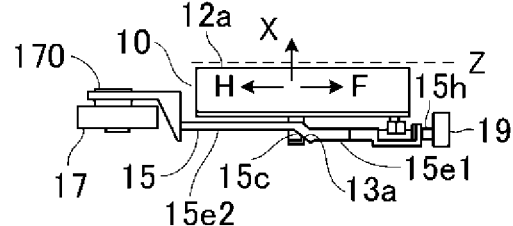
FIG.6F SEPARATION POSITION
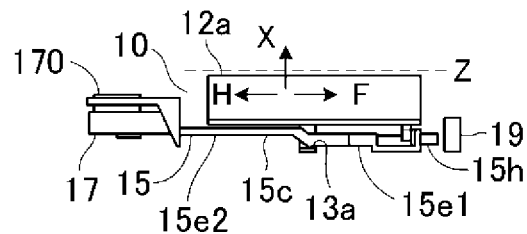

SEPARATION POSITION
SHUTTER CLOSED

CONTACT POSITION
SHUTTER OPEN

SEPARATION POSITION
SHUTTER CLOSED

SEPARATION POSITION
SHUTTER CLOSED

CONTACT POSITION
SHUTTER OPEN

SEPARATION POSITION
SHUTTER CLOSED

SEPARATION POSITION
SHUTTER CLOSED

CONTACT POSITION
SHUTTER OPEN

SEPARATION POSITION
SHUTTER CLOSED

FIG.15A SEPARATION POSITION
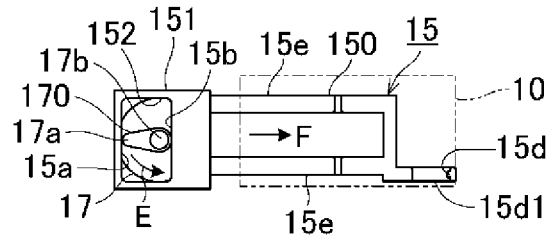
FIG.15B
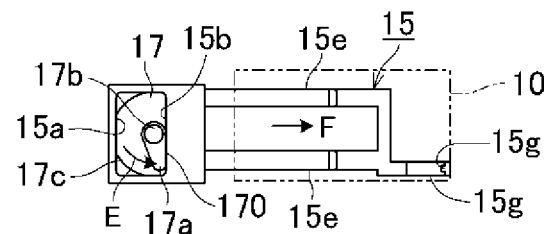
FIG.15C CONTACT POSITION
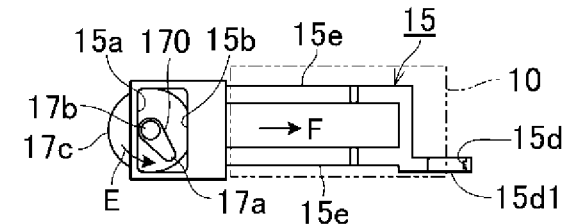
FIG.15D CONTACT POSITION
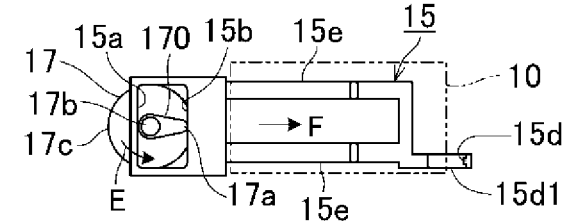
FIG.15E
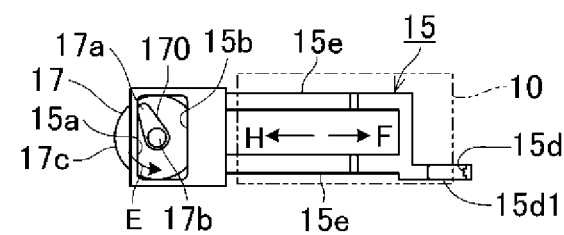
FIG.15F SEPARATION POSITION
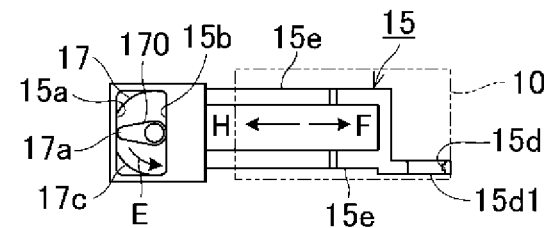

FIG.16A SEPARATION POSITION
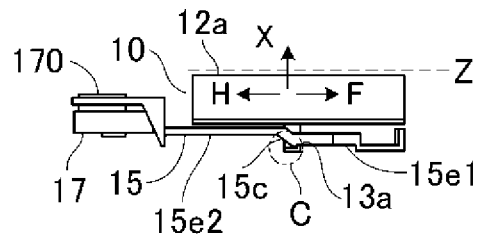
FIG.16B
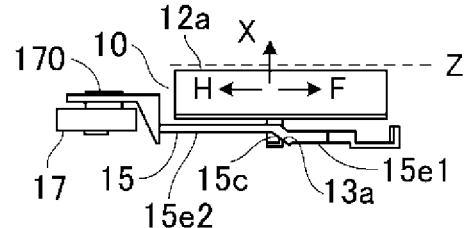
FIG.16C
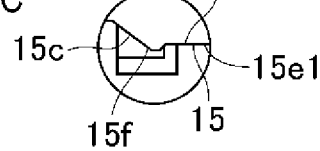
FIG.16D CONTACT POSITION
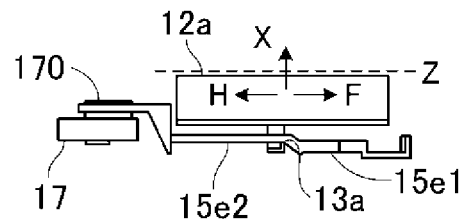
FIG.16E
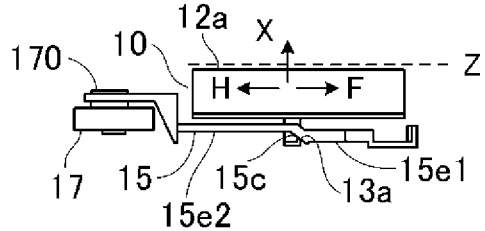
FIG.16F SEPARATION POSITION
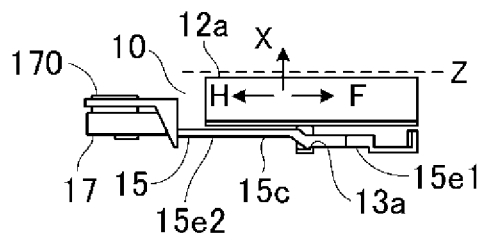

SEPARATION POSITION
SHUTTER CLOSED

CONTACT POSITION
SHUTTER OPEN

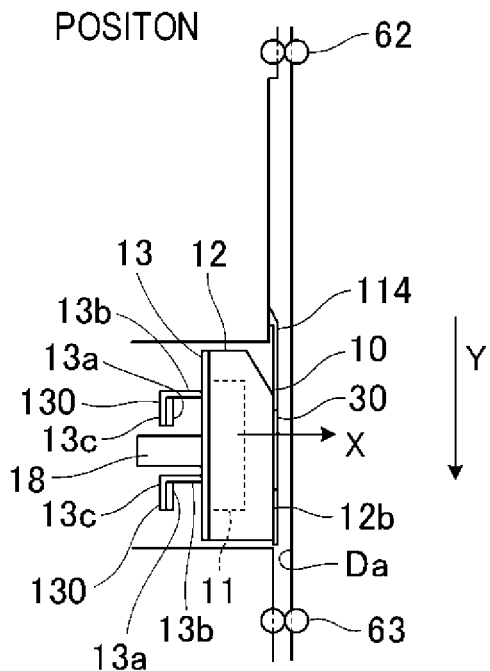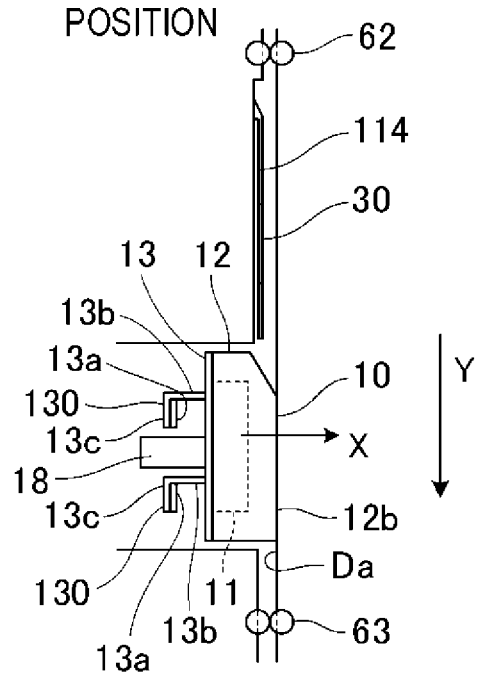

DETECTING APPARATUS AND IMAGE FORMING APPARATUS

BACKGROUND OF THE INVENTION

Field of the Invention

The present invention relates to a detecting apparatus irradiating light toward a detection material and detecting reflected light from the detection material, and an image forming apparatus.

Description of the Related Art

In recent years, there is a growing need for higher image quality and better ecological measures in image forming apparatuses such as copiers, laser beam printers, and inkjet printers.

In situations where high image quality is required, conventionally, a patch image of a reference pattern formed on a recording material (a detection material) is detected by a detecting apparatus arranged inside an image forming apparatus. In addition, output data of the detecting apparatus is compared with data of the reference pattern to create correction data to be used for correcting image quality such as a tinge of an image to be formed next.

On the other hand, as an ecological measure, a detecting apparatus detects an image representing surface properties of a recording material (a recording medium), and by determining a type of the recording material, image formation conditions are changed in accordance with the type of the recording material so that printing is performed with the least amount of energy.

Since the detecting apparatus used in these techniques read a patch image on a recording material or an image representing surface properties of the recording material, the detecting apparatus is desirably arranged inside a transport path along which the recording material is transported during image formation.

However, arranging the detecting apparatus inside a transport path creates a risk of the detecting apparatus being contaminated by paper powder or the like and losing the ability to accurately detect a patch image on a recording material surface properties of the recording material.

As a solution to such a problem, a configuration is known in which a shutter (an opening/closing member) that opens and closes an opening of a detecting apparatus is disposed (refer to Japanese Patent Application Laid-open No. 2013-205258). An imaging portion is provided with an illuminating light source (a light emitting element) which emits light toward a reference chart (a detection material) through an opening and a sensor (a light receiving element) which receives reflected light from the reference chart. By opening the shutter (the opening/closing member) during imaging and closing the shutter during normal transportation of a recording material during which imaging is not performed, contamination by paper powder and the like is minimized.

In addition, in order to improve reading accuracy by the detecting apparatus, a distance between the light receiving element and the recording material is desirably controlled to be constant. Since a constant distance can be realized by bringing the detecting apparatus into close contact with the recording material during detection, a method is conceivable in which the detecting apparatus is abutted against an opposing surface that oppose the detecting apparatus in the transport path to sandwich the recording material.

However, constantly abutting the detecting apparatus against the opposing surface of the transport path raises concerns that a defective image may be created due to friction or the like and that a paper jam or the like of recording material with low stiffness may occur. Therefore, the detecting apparatus is desirably brought into contact with the opposing surface of the transport path during reading and separated from the opposing surface when reading is not performed.

As a technique for realizing such a contacting/separating operation of a detecting apparatus, for example, Japanese Patent Application Laid-open No. 2013-148503 proposes a configuration in which a colorimetric unit (an apparatus main body of a detecting apparatus) provided with a colorimetric sensor (a light receiving element) moves between a first position where the colorimetric unit presses a recording material (a detection material) and a second position where the pressing is released.

SUMMARY OF THE INVENTION

However, conventionally, a shutter and a configuration for causing contact and separation of an apparatus main body of a detecting apparatus in order to improve detection accuracy of a recording material and to maintain transportability of the recording material when reading is not performed only existed individually. In other words, a technique that provides both a shutter opening/closing function and a contact/separation function with respect to a detection material has not yet been disclosed.

An object of the present invention is to prevent contamination while improving detection accuracy of a detection material and maintaining transportability when detection is not being performed by providing both an opening/closing mechanism of an opening/closing member and a contact/separation mechanism with respect to the detection material.

In order to achieve the object described above, the present invention includes:

a light emitting element which emits light toward a detection material;

a light receiving element which receives reflected light from the detection material; and an apparatus main body having an opening/closing member which opens and closes an opening through which light emitted from the light emitting element and reflected light from the detection material pass through, wherein the apparatus main body is capable of moving between a first position where the apparatus main body comes into contact with the detection material and a second position where the apparatus main body separates from the detection material, and the opening/closing member opens in accordance with a movement of the apparatus main body to the first position and closes in accordance with a movement of the apparatus main body to the second position.

In addition, an image forming apparatus according to the present invention includes:

the detecting apparatus described above, wherein the detecting apparatus is arranged opposite a transport path of a recording medium as the detection material.

According to the present invention, contamination can be prevented while improving detection accuracy of a detection material and maintaining transportability when detection is not being performed by providing both an opening/closing mechanism of an opening/closing member and a contact/separation mechanism with respect to the detection material.

Further features of the present invention will become apparent from the following description of exemplary embodiments with reference to the attached drawings.

BRIEF DESCRIPTION OF THE DRAWINGS

FIGS. 4A to 4C are an enlarged sectional view of a colorimetric apparatus and schematic views of an internal configuration of a colorimeter shown in FIGS. 1A and 1B;

FIGS. 5A to 5F are schematic views representing a relationship between a cam gear and a slide cam shown in FIGS. 1A and 1B;

FIGS. 6A to 6F are schematic views representing a relationship between the slide cam and a colorimetric unit shown in FIGS. 1A and 1B;

FIGS. 15A to 15F are schematic views representing a relationship between a cam gear and a slide cam according to a fourth embodiment of the present invention;

FIGS. 16A to 16F are schematic views representing a relationship between the slide cam and a colorimetric unit according to the fourth embodiment of the present invention;

FIGS. 23A and 23B are enlarged sectional views of a colorimetric apparatus according to a fifth embodiment of the present invention.

DESCRIPTION OF THE EMBODIMENTS

Hereinafter, the present invention will be described in detail based on illustrated embodiments.

In the following description, an image forming apparatus mounted with a colorimetric apparatus as the detecting apparatus according to the present invention will be described as an example. An electrophotographic system color laser printer (hereinafter, LBP) is exemplified as the image forming apparatus. A colorimetric apparatus refers to a device which, for the purpose of realizing a stable tinge of an output image, detects the tinge of the output image and feeds back the detected tinge to a process condition of the image forming apparatus. The detecting apparatus according to the present invention is not limited to a colorimetric apparatus and can be utilized in a so-called media sensor or the like which photographs surface properties of a recording material (a recording medium) and determines a type of the recording material. In addition, while the present invention is applied to an LBP as an image forming apparatus, the present invention is not limited thereto and can also be applied to a copier, an inkjet printer, and the like.

Configuration of Image Forming Apparatus

Figure 2:
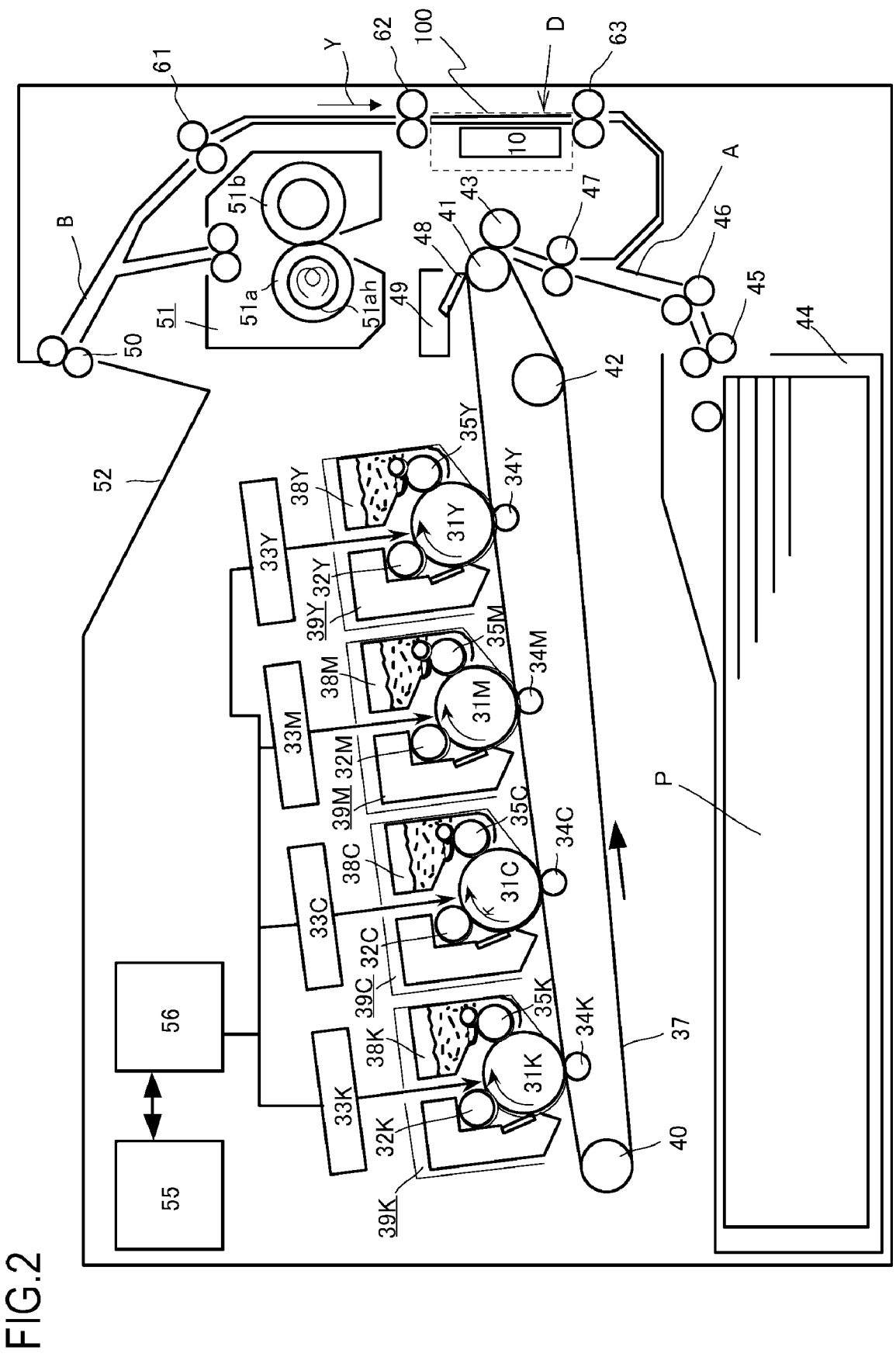
FIG. 2 is a schematic sectional view of an image forming apparatus to which the present invention is applied.

First, a schematic configuration of an LBP as an image forming apparatus to which the present invention is applied will be described with reference to FIG. 2. FIG. 2 shows a schematic sectional configuration of the LBP to which the present invention is applied.

First, an image forming portion will be described.

The image forming portion is provided with photosensitive members (hereinafter, referred to as photosensitive drums) 31Y, 31M, 31C, and 31K for each station of the respective colors of YMCK. Charging rollers 32Y, 32M, 32C, and 32K as primary charging portion, exposure scanner portions 33Y, 33M, 33C, and 33K, and developing devices 38Y, 38M, 38C, and 38K as developing portions are provided around the photosensitive drums 31Y, 31M, 31C, and 31K.

The photosensitive drums 31Y, 31M, 31C, and 31K are configured by applying an organic photoconductive layer on an outer circumference of an aluminum cylinder, and rotate as a driving force of a drive motor (not shown) is transmitted thereto. The drive motor rotates the photosensitive drums 31Y, 31M, 31C, and 31K in a clockwise direction in accordance with an image forming operation.

The photosensitive drums 31Y, 31M, 31C, and 31K, the charging rollers 32Y, 32M, 32C, and 32K, and the developing devices 38Y, 38M, 38C, and 38K are integrally configured and constitute toner cartridges 39Y, 39M, 39C, and 39K that are attachable to and detachable from an image forming apparatus main body.

The photosensitive drums 31Y, 31M, 31C, and 31K are arranged in a single row along an intermediate transfer belt 37, and primary transfer rollers 34Y, 34M, 34C, and 34K are provided on the intermediate transfer belt 37 so as to correspond to the respective photosensitive drums 31Y, 31M, 31C, and 31K. The intermediate transfer belt is an endless belt which is stretched between a driver roller 41 and a tension roller 40 and which is subjected to tension by an auxiliary roller 42. In addition, a secondary transfer roller 43 comes into contact with a section where the intermediate transfer belt 37 is wound around the driver roller 41 to constitute a secondary transfer portion.

A paper feeding cassette 44 which stores a recording material P that is a recording medium is arranged below the intermediate transfer belt 37. In addition, a paper feeding transport path A is provided which transports the recording material P in the paper feeding cassette 44 toward the secondary transfer portion that is a contact region of the secondary transfer roller 43 and the intermediate transfer belt 37 using paper feeding rollers 45 and 46. Furthermore, a fixing portion 51 is arranged above the secondary transfer portion, and a paper discharging transport path B which discharges the recording material P having been discharged from the fixing portion 51 to a paper discharge tray 52 on an upper surface of the apparatus using a paper discharge roller 50 is provided above the fixing portion 51. In addition, in the present embodiment, a duplex transport path D which returns the recording material P from the paper discharging transport path B to the paper feeding transport path while circumventing the fixing portion 51 is provided.

Moreover, reference numeral 55 denotes a main body control portion and reference numeral 56 denotes an image formation control portion for controlling operations of the components described above.

Next, an operation of the LBP will be described.

When the main body control portion 55 described above receives an image signal, the recording material P is fed out from the paper feeding cassette 44 by the paper feeding rollers 45 and 46. Subsequently, the recording material P is temporarily sandwiched between roller-like synchronizing rotating members or, in other words, a transporting roller pair (a resist roller pair) 47 for synchronizing an image forming operation to be described later with the transportation of the recording material P, and the recording material P stops and stands by.

On the other hand, the image formation control portion 56 drives the exposure scanner portions 33Y, 33M, 33C, and 33K in accordance with the received image signal. In addition, surfaces of the photosensitive drums 31Y, 31M, 31C, and 31K having been uniformly charged by the charging rollers 32Y, 32M, 32C, and 32K are exposed and scanned to form an electrostatic latent image.

The developing devices 38Y, 38M, 38C, and 38K are means for visualizing the electrostatic latent image and develop yellow (Y), magenta (M), cyan (C), and black (K) for each station. The respective developing devices 38Y, 38M, 38C, and 38K are provided with sleeves 35Y, 35M, 35C, and 35K and a developing bias for visualizing the electrostatic latent image is applied to the developing devices 38Y, 38M, 38C, and 38K. In this manner, the electrostatic latent image formed on the surfaces of the photosensitive drums 31Y, 31M, 31C, and 31K is developed by the developing devices 38Y, 38M, 38C, and 38K as a monochromatic toner image.

The intermediate transfer belt 37 is in contact with the photosensitive drums 31Y, 31M, 31C, and 31K and rotates in synchronization with the rotation of the photosensitive drums 31Y, 31M, 31C, and 31K in a counterclockwise direction during color image formation. The developed monochromatic toner images are sequentially transferred due to the action of a primary transfer bias applied to the primary transfer roller 34 and becomes a multicolor toner image on the intermediate transfer belt 37.

Subsequently, the multicolor toner image formed on the intermediate transfer belt 37 is transported to a secondary transfer nip portion formed by the driver roller 41 and the secondary transfer roller 43. At the same time, the recording material P standing by in a state of being sandwiched by the transporting roller pair 47 is transported to the secondary transfer nip portion while being synchronized with the multicolor toner image on the intermediate transfer belt 37 due to the action of the transporting roller pair 47. The multicolor toner image on the intermediate transfer belt 37 is collectively transferred due to the action of a secondary transfer bias applied to the secondary transfer roller 43.

The fixing portion 51 melts and fixes the transferred multicolor toner image while transporting the recording material P and is provided with a fixing roller 51a for heating the recording material P and a pressure roller 51b for pressing the recording material P against the fixing roller 51a. The fixing roller 51a and the pressure roller 51b are formed in a hollow shape, and a heater 51ah is built into the fixing roller.

The recording material P holding the multicolor toner image is transported by the fixing roller 51a and the pressure roller 51b and, at the same time, heat and pressure are applied to the recording material P to fix the toner onto a recording material surface.

The recording material P after the toner image is fixed is discharged to the paper discharge tray 52 by the paper discharge roller 50 to end the image forming operation. Alternatively, when image formation is to be performed on a second side, the recording material P is returned to the paper feeding transport path A via the duplex transport path D by a switchback operation at the paper discharging transport path B, and the recording material P is once again temporarily sandwiched by the transporting roller pair 47 (the resist roller pair) and stops and stands by. Subsequently, the series of image forming operations described above is performed and an image is formed on the second side of the recording material P. The duplex transport path D is configured to extend inclined diagonally downward from the paper discharging transport path B so as to circumvent the fixing portion 51, subsequently extend vertically downward, and further change directions in a U-shape and merge with the paper feeding transport path A. A first transporting roller pair 61, a second transporting roller pair 62, and a third transporting roller pair 63 are sequentially arranged at prescribed intervals on the duplex transport path D in a downward direction from the side of the paper discharging transport path B.

Cleaning means 48 is configured to clean toner remaining on the intermediate transfer belt 37 as untransferred toner, and the untransferred toner collected by the cleaning means 48 is stored in a cleaner container 49 as waste toner.

Colorimetry of Toner Patch

Next, colorimetry of a toner patch by a colorimetric apparatus 100 which constitutes the detecting apparatus according to the present invention will be described.

As shown in FIG. 2, the colorimetric apparatus 100 is provided in a vertically extending region of the duplex transport path D or, in the illustrated example, between the second transporting roller pair 62 and the third transporting roller pair 63. The colorimetric apparatus 100 is provided with a colorimetric unit 10 as an apparatus main body which performs colorimetry of an image on the recording material P and outputs a result of the colorimetry as electronic data.

Figure 3:
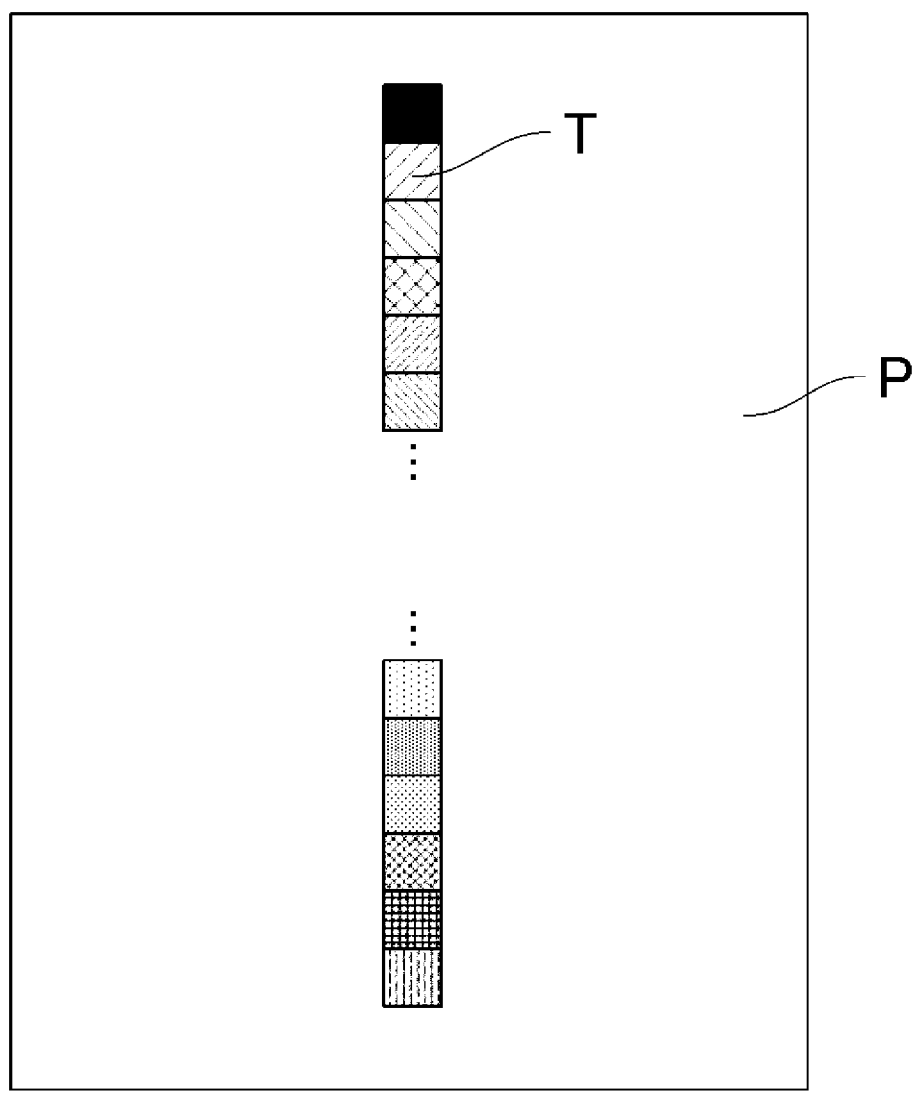
FIG. 3 is a schematic view of a toner patch image formed on a recording material.

When a colorimetric mode of a toner patch T is started, first, the toner patch T that is a patch image for image quality correction such as that shown in FIG. 3 is formed on the recording material P by the series of operations described earlier. The toner patch T is created by, for each color, forming images of a plurality of basic patterns with different densities in a single row along a transport direction of the recording material P in a central section in a width direction that is perpendicular to the transport direction.

The recording material P having passed through the fixing portion 51 is transferred to the duplex transport path D due to a switchback operation at the paper discharging transport path B, and colorimetry of the toner patch T formed on the recording material P is sequentially performed by the colorimetric unit 10 in synchronization with the transportation of the recording material P. In order to perform colorimetry of the toner patch T formed at the center in the width direction of the recording material P, the colorimetric unit 10 is arranged in a direction perpendicular to a transport direction Y (vertically downward in the illustrated example) of the duplex transport path D or, in other words, arranged opposite a central section of longitudinal directions of the second and third transporting roller pairs 62 and 63.

The recording material P after colorimetry by the colorimetric unit 10 and having passed through the duplex transport path D makes a U-turn at a lower end of the duplex transport path D and returns to the paper feeding transport path A, passes through the secondary transfer portion and the fixing portion 51, and is discharged to the paper discharge tray 52 by the paper discharge roller 50.

The series of image forming operations and toner patch colorimetric operations are controlled by the main body control portion 55, and colorimetric data of the toner patch T measured by the colorimetric unit 10 is sent to the main body control portion 55. At the main body control portion 55, color correction data is created based on the colorimetric data and fed back to image information of an image to be formed next.

First Embodiment

Next, a colorimetric apparatus (detecting apparatus) 100 according to a first embodiment of the present invention will be described in detail with reference to FIGS. 1 and 4 to 7.

Colorimetric Unit

First, a schematic configuration of the colorimetric unit 10 constituting the colorimetric apparatus 100 will be described with reference to FIGS. 4A to 4C. FIG. 4A shows a separation state in which the colorimetric unit 10 is separated from a transport surface Da which guides the recording material P, and FIG. 4B shows a contact state in which the colorimetric unit 10 is in contact with the transport surface Da. FIG. 4C is a schematic view of an internal configuration of the colorimetric unit 10 shown in FIG. 4B as viewed from the direction Y.

The colorimetric unit 10 is arranged so as to face the duplex transport path D and is movable forward and backward in a perpendicular direction with respect to the transport surface Da of the duplex transport path D which opposes the colorimetric unit 10. In the following description, a contact direction in which the colorimetric unit 10 comes into contact with the transport surface Da will be denoted by X and the transport direction of the recording material P will be denoted by Y. In addition, for each component, a surface on a side of the transport surface Da will be referred to as a front surface and a surface on an opposite side of the transport surface Da will be referred to as a rear surface.

The colorimetric unit 10 includes a colorimeter 11 as a detecting portion which performs colorimetry of a toner patch on the recording material P (a detection material) passing through the duplex transport path D and a shutter 14 as an opening/closing member which opens and closes a colorimetric window 11a that is an opening of the colorimeter 11. The colorimetric unit 10 is also provided with a colorimeter base 13 for fixing the colorimeter 11 and a colorimeter cover 12 as a cover member that covers the colorimeter 11 and the shutter 14. The colorimetric window 11a is protected so that dust, paper powder, and the like do not penetrate into the colorimeter 11 by having, for example, an opening surface closed by glass, a cover sheet, or the like. The shutter 14 is a member for preventing the opening surface constituted by glass, a cover sheet, or the like of the colorimetric window 11a from being contaminated by dust, paper powder, and the like.

The colorimeter 11 includes a light source (a light emitting element) 111 such as an LED which irradiates the toner patch on the recording material P (the detection material) with light and a light receiving element 112 such as a line sensor which receives reflected light from the toner patch. The colorimetric window 11a is a portion which light emitted from the light source 111 and reflected light from the recording material P pass through and which is opened and closed by the shutter 14.

As exemplified in FIG. 4C, an internal configuration of the colorimeter 11 includes a diffraction grating 115 which disperses diffused and reflected light from the recording material P, and the colorimeter 11 is configured to receive light dispersed by the diffraction grating 115 with the light receiving element 112. A light guiding member 113-1 provided with a lens which converges irradiation light from the light source 111 onto the recording material is arranged in a recording material reflection optical path from the light source 111, and a light guiding member 113-2 provided with a lens which converges reflected light onto the diffraction grating 115 and a slit 116 are arranged in an optical path from the recording material to the diffraction grating 115. However, the internal configuration of the colorimeter 11 is not limited to the illustrated configuration and need only be a configuration including dispersing means such as the diffraction grating 115 in the illustrated example, a prism, or the like. Various configurations can be adopted with respect to arrangements of the light source 111, the light receiving element 112, and the diffraction grating 115 and configurations of the optical paths depending on an arrangement space, a position of the colorimetric window 11a, and the like.

Figure 1A:
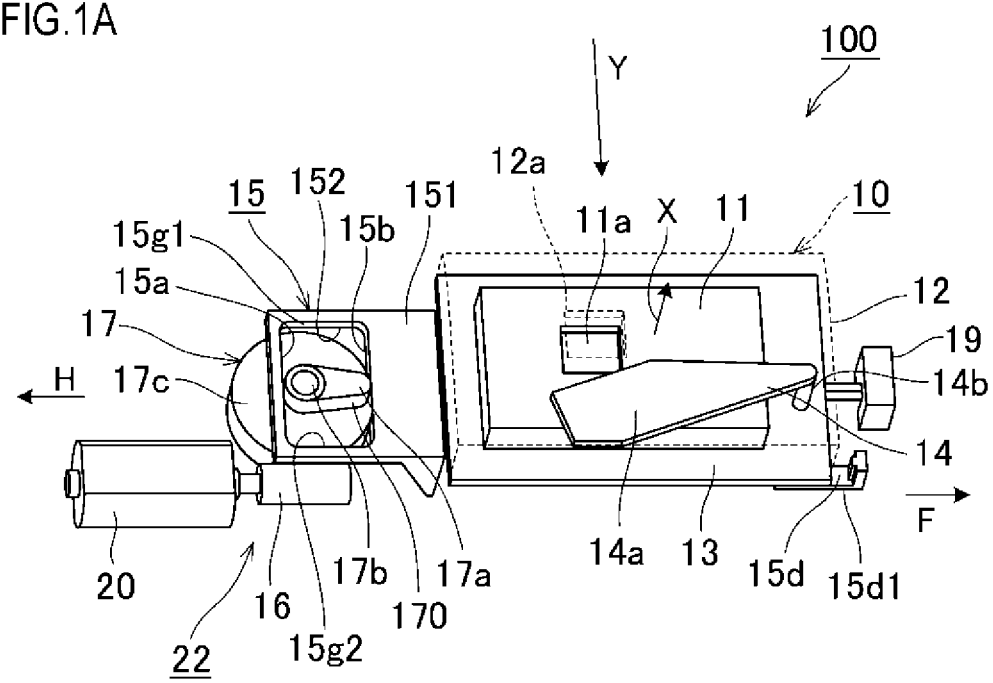
FIGS. 1A and 1B are schematic perspective views showing an actuating mechanism of a colorimetric unit according to a first embodiment of the present invention.
Figure 1B:
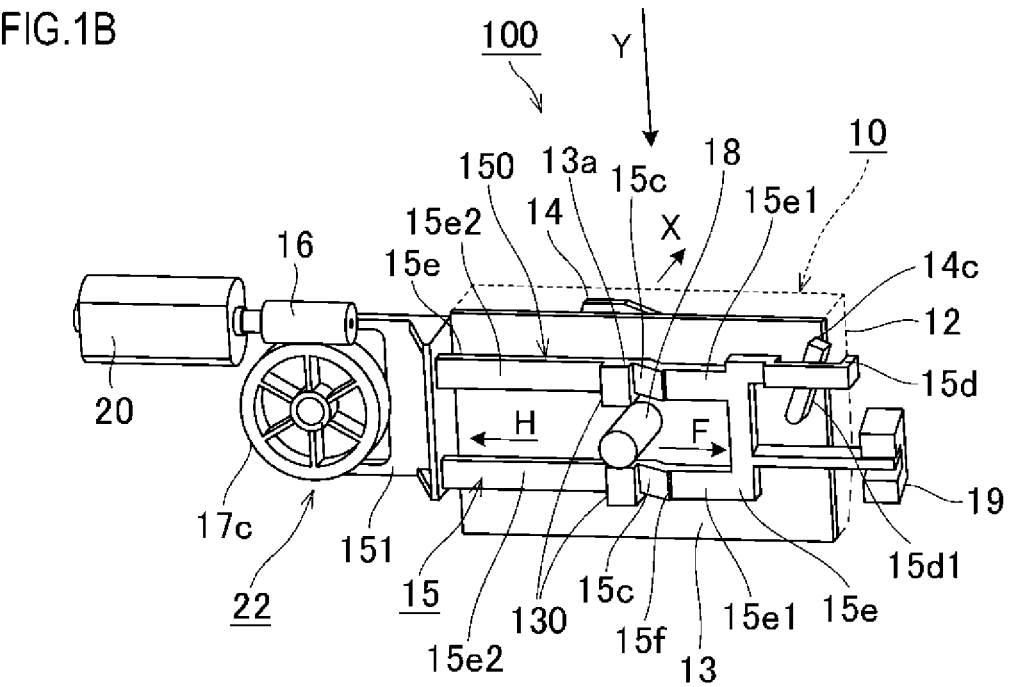

The colorimeter base 13 is a plate-like member which is fixed to a rear surface of the colorimeter 11 and which is provided parallel to the transport surface Da. An L-shaped engagement piece 130 which includes a contact region 13a and which engages with a slide cam 15 such as that shown in FIGS. 1A and 1B is provided on a rear surface of the colorimeter base 13. The engagement piece 130 has a base section 13b which extends in an opposite direction to a contact direction X from the rear surface of the colorimeter base 13 and a bent section 13c which bends parallel to a transport direction Y from a tip of the base section 13b, and the contact region 13a is provided so as to project from the bent section 13c. The slide cam will be described later.

The colorimeter cover 12 has an open box-like sectional shape with a side of the colorimeter base 13 being open, and an end of the colorimeter cover 12 is fixed to the colorimeter base 13 and constitutes a housing together with the colorimeter cover 12. In addition, a front surface 12b opposite the duplex transport path D constitutes a plane parallel to the transport surface Da of the opposing duplex transport path D. The opening 12a is also provided on the front surface 12b of the colorimeter cover 12. An opening surface of the opening 12a is not closed by glass, a cover sheet, or the like as was the case with the colorimetric window 11a. The opening 12a is not closed by glass, a cover sheet, or the like because the opening 12a is a member which comes into contact with the transport surface Da and the presence of glass, a cover sheet, or the like may cause a decline in detection accuracy due to the opening 12a being damaged or dust, paper powder, or the like adhering to the glass, the cover sheet, or the like by coming into contact with the recording material P during detection. However, since dust, paper powder, or the like passes through the opening 12a if the opening 12a is hollow, a configuration is adopted which prevents contamination by covering the opening surface of the colorimetric window 11a with the shutter 14.

With the colorimetric unit 10, a position where the front surface 12b of the colorimeter cover 12 facing the duplex transport path D is in contact with the transport surface Da is a contact position (the first position) (refer to FIG. 4B) and a position where the front surface 12b is separated from the transport surface Da is a separation position (the second position) (FIG. 4A).

The colorimetric unit 10 is biased in the contact direction X with respect to the transport surface Da by a biasing member 18 that is the first biasing member. The biasing member 18 is arranged so as to press a rear surface of the colorimetric unit 10. In other words, in a compressed state, one end of the biasing member 18 engages with a rear surface of the colorimeter base 13 and another end of the biasing member 18 engages with a main body frame (not shown).

At the separation position, a gap between the front surface 12b of the colorimeter cover 12 and the transport surface Da is set more or less equal to a gap of the duplex transport path D and functions as a transport surface which guides a recording surface side of the toner patch T of the colorimetric unit 10. An upstream-side portion of a front surface of the colorimetric unit 10 is provided with an inclined surface which is inclined so that a gap with the transport surface Da gradually widens toward an upstream end.

During colorimetry of the toner patch, at the contact position, the front surface 12b of the colorimeter cover 12 presses the recording material P against the transport surface Da due to a biasing force (which does not affect a toner image and which does not obstruct transportation) of the biasing member 18, and the recording material P is sandwiched and transported by the colorimetric unit 10 and the transport surface Da. This is done in order to transport the recording material P in a state where a variation in distance between the recording material P and the colorimeter 11 in the colorimetric unit 10 is minimized. Accordingly, the toner patch T for colorimetry formed on the recording material P can be read in a stable manner and a high colorimetric accuracy of the toner patch T can be ensured.

In addition, a white reference plate 30 as the reference section is arranged on the transport surface Da which is an opposing section opposed by the colorimetric unit 10. The white reference plate 30 provides a reference for toner patch colorimetry, and by performing colorimetry of the white reference plate 30 prior to colorimetry of the toner patch T on the recording material P, color reproducibility is ensured.

In other words, before performing colorimetry of the toner patch T on the recording material P, the front surface 12b of the colorimeter cover 12 of the colorimetric unit 10 is moved to the contact position with the transport surface Da and brought into close contact with the white reference plate 30 (refer to FIG. 4B). At this point, colorimetry of the white reference plate 30 is performed and a result of the colorimetry is stored in main body control portion 55 as a reference color. Subsequently, as described earlier, colorimetry of the toner patch T on the recording material P is performed, color correction data is created by comparing the stored reference color information with a colorimetry result of the toner patch, and the color correction data is fed back to a process condition of image formation.

Configurations of Colorimetric Unit and Actuating Mechanism

Next, the colorimetric unit 10 which constitutes the colorimetric apparatus 100 and an actuating mechanism 22 which realizes an advancing/retracting operation (a contacting/separating operation) of the colorimetric unit 10 with respect to the duplex transport path D will be described in detail with reference to FIGS. 1A and 1B.

FIGS. 1A and 1B are schematic perspective views showing the colorimetric unit 10 and an actuating mechanism thereof according to the present first embodiment, in which FIG. 1A is a perspective view of the colorimetric unit 10 as seen from a front surface side and FIG. 1B is a vertically flipped perspective view of the colorimetric unit 10 shown in FIG. 1A as seen from a rear surface side.

Configurations of Shutter 14 and Colorimetric Window 11a of Colorimetric Unit 10

As described above, the colorimetric unit 10 is constituted by the colorimeter 11, the colorimeter base 13, the colorimeter cover 12, and the shutter 14, and these components are movable in the contact direction X and in a separation direction that is opposite to the contact direction X in an integrated manner. Since the colorimeter base 13 and the colorimeter cover 12 are as described with reference to FIGS. 4A to 4C, the following description will mainly focus on the shutter 14 and the colorimetric window 11a provided in the colorimeter 11.

The shutter 14 is configured to, in conjunction with the colorimetric unit 10, open when the colorimetric unit 10 is at the contact position (the first position) and close when the colorimetric unit 10 is at the separation position (the second position).

The colorimetric window 11a is provided on a front surface of the colorimeter 11, and colorimetry of the toner patch T on the recording material P on the transport surface Da or an image of the white reference plate 30 on the transport surface Da is performed through the colorimetric window 11a. A opening 12a corresponding to the colorimetric window 11a of the colorimeter 11 is also formed on the front surface 12b of the colorimeter cover 12.

The shutter 14 is constituted by a thin plate arranged along the front surface of the colorimeter 11, and the shutter 14 is configured so as to swing along the front surface of the colorimeter 11 via a spindle 14b and to open and close so as to cross the colorimetric window 11a in a direction perpendicular to the contact direction X. The spindle 14b rotatably supports one end of the shutter 14 with respect to the colorimeter base 13 and is configured so as swing between a closed position at which a light shielding surface section 14a of the shutter 14 closes the colorimetric window 11a and an open position at which the light shielding surface section 14a opens the colorimetric window 11a. The spindle 14b extends parallel to the contact direction X and projects from a rear surface side of the colorimeter base 13, and a lever 14c for rotating the shutter 14 is mounted to a projected end of the spindle 14b.

Configuration of Actuating Mechanism 22

The actuating mechanism 22 is provided with a motor 20 as a driving source, a worm 16 mounted to an output shaft of the motor 20, and a cam gear 17 which meshes with the worm 16. The cam gear 17 is configured such that a worm wheel 17c which meshes with the worm 16 and constitutes a worm gear and a rotating cam 170 are integrated by a common rotating shaft 17b, and the rotating cam 170 is rotated by rotation of the worm wheel 17c. In addition, the slide cam 15 which engages with the rotating cam 170 and which is linearly driven (linear reciprocating motion) by a prescribed distance by a rotating motion of the cam gear 17 is provided. A movement direction of the slide cam 15 is a direction perpendicular to the transport direction Y of the recording material P and also perpendicular to the contact direction X of the colorimetric unit 10. In the movement direction of the slide cam 15, one movement direction will be referred to as a forward movement direction F and another movement direction will be referred to as a backward movement direction H.

The motor 20 is fixed to the main body frame (not shown), and the output shaft of the motor 20 is oriented in a direction perpendicular to the transport direction Y of the recording material of the slide cam 15 and also perpendicular to an operating direction of the colorimetric unit 10. With respect to a rotation of the motor 20, a direction of a rotational axis of the cam gear 17 is converted by the worm 16 into a direction parallel to the contact direction X of the colorimetric unit 10.

The slide cam 15 is supported so as to be movable in a slide direction (F, H) but not movable in the transport direction Y and the contact direction X. The slide cam 15 is arranged at a prescribed interval in an opposite direction to the contact direction X on a rear surface side of the colorimeter base 13 of the colorimetric unit 10. The slide cam 15 is configured so as to include a cam main body section 150, a cam receiving section 151 provided at one end in the slide direction (F, H) of the cam main body section 150, and a shutter pressing section 15d provided at another end in the slide direction of the cam main body section 150. The shutter pressing section 15d is provided so as to bend toward a tip of an extension piece 15d1 that extends from the other end of the cam main body section 150, and the shutter pressing section engages the lever 14c during a reciprocating movement of the slide cam 15 and presses the shutter 14 in a direction in which the shutter 14 closes.

The cam main body section 150 is a frame body in which both ends of a pair of upper and lower slide pieces 15e and 15e extending parallel to each other in the slide direction across a prescribed interval are connected to each other by vertical pieces, and the biasing member 18 described earlier is arranged using a space between the slide pieces 15e and 15e.

The cam receiving section 151 is constituted by a plate-shaped section perpendicular to the contact direction X and is provided with a rectangular opening 152 into which the rotating cam 170 of the cam gear 17 fits. The opening 152 has first and second cam receiving surfaces 15a and 15b that are two inside surfaces which extend in a direction perpendicular to the slide direction and which oppose each other and two inside surfaces 15g1 and 15g2 which extend in a direction parallel to the slide direction (F, H) and which oppose each other. Among the two inside surfaces that extend in a direction perpendicular to the slide direction, the first cam receiving surface 15a is far from the cam main body section 150 and the second cam receiving surface 15b is close to the cam main body section 150.

The rotating cam 170 of the cam gear 17 is an egg-shaped plate cam fixed to the rotating shaft 17b, and when a portion with a largest radius of a cam surface is considered a top cam surface 17a, a major axis of the rotating cam 170 is equal to a distance between the first cam receiving surface 15a and the second cam receiving surface 15b. On the other hand, the two inside surfaces 15g1 and 15g2 which are parallel to the slide direction are configured so that the top cam surface 17a of the rotating cam 170 does not interfere with the inside surfaces 15g1 and 15g2 while the rotating cam 170 is rotating, and a distance between the inside surfaces 15g1 and 15g2 is set to an interval that prevents interference with the top cam surface 17a. The slide cam 15 reciprocates in the slide direction due to rotation of the cam gear 17.

The contact region 13a of the engagement piece 130 which comes into contact with the slide piece 15e of the slide cam 15 reciprocates in a prescribed range between a forward movement limit and a backward movement limit of a rear surface of the slide piece 15e in accordance with a reciprocation of the slide cam 15. In this case, the forward movement direction F is a direction in which the cam main body section 150 of the slide cam 15 separates from the rotating shaft 17b of the rotating cam 170, and the backward movement direction H is a direction in which the cam main body section 150 approaches the rotating shaft 17b of the rotating cam 170.

In a range of sliding movement of the contact region 13a, the rear surface of the slide piece 15e constitutes an inclined surface 15c which is gradually inclined in a direction approaching a transport surface from the backward movement limit toward the forward movement limit. In other words, the rear surface of the slide piece 15e is provided with a difference in level including a first surface 15e1 which is far from the transport surface Da and a second surface 15e2 which is close to the transport surface Da, the first surface 15e1 and the second surface 15e2 separated from each other by the inclined surface 15c. In addition, a click section 15f is formed at a boundary section between the inclined surface 15c and the first surface 15e1 which is far from the transport surface Da so as to project from the boundary section.

FIGS. 1A and 1B show a state where the contact region 13a is at a forward movement limit position or, in other words, the contact region 13a is positioned near a boundary section between the inclined surface 15c and the second surface 15e2 which is close to the transport surface Da, and holds the colorimetric unit 10 at a contact position.

The top cam surface 17a of the cam gear 17 is positioned on the second cam receiving surface 15b, and when the slide cam 15 is positioned at the forward movement limit (the colorimetric unit 10 is at the contact position), the shutter pressing section 15d does not engage with the lever 14c and the shutter 14 is at the open position in a free state. When the slide cam 15 reaches the backward movement limit (the colorimetric unit 10 is at the separation position), the shutter pressing section 15d engages with the lever 14c and moves the shutter 14 to the closed position.

Description of Contacting/Separating Operation of Colorimetric Unit 10

Next, a contacting/separating operation of the colorimetric unit 10 will be described with reference to FIGS. 5 and 6.

FIGS. 5A to 5F are schematic views representing a relationship between the cam gear 17 and the slide cam 15 shown in FIGS. 1A and 1B, and FIGS. 6A to 6F are schematic views representing a relationship between the slide cam 15 and the colorimetric unit 10 and showing the slide cam 15 from below. In FIGS. 6A to 6F, while detection materials differ between a case where colorimetry of the toner patch T on the recording material P is performed and a case where colorimetry of the white reference plate 30 of the transport surface Da is performed and contact positions differ between the cases by a thickness of the recording material P, the recording material P and the white reference plate 30 collectively constitute a colorimetric surface Z of the detection material. In some cases where the white reference plate 30 is not provided, the transport surface Da itself may be the detection material.

Transition Operation from Separation Position to Contact Position

First, an operation when the colorimetric unit 10 makes a transition from the separation position to the contact position with respect to the colorimetric surface Z will be described.

Normally, the colorimetric unit 10 is at the separation position where the colorimetric unit 10 is retracted from the colorimetric surface Z (FIG. 6A). At this point, as shown in FIG. 5A, the top cam surface 17a of the rotating cam 170 is in perpendicular contact with the first cam receiving surface 15a of the cam receiving section 151 of the slide cam 15. Let us assume that a phase of the cam gear 17 at this point is 0 degrees (a first dead center). At this point, the slide cam 15 is positioned at the backward movement limit in a backward movement direction H. The backward movement direction H is a direction in which the cam main body section 150 of the slide cam 15 moves toward a side of the rotating shaft 17b of the cam gear. The contact region 13a of the engagement piece 130 of the colorimetric unit 10 which comes into contact with the slide piece 15e is at a position which is on the first surface 15e1 that is far from the colorimetric surface Z and which is near a boundary section with the inclined surface 15c, and engages with the click section 15f which is projected to the boundary section (refer to FIG. 6A).

When the motor 20 is driven from this separation position, a rotational driving force of the motor 20 is transmitted to the cam gear 17 through the worm 16 and the cam gear 17 rotates in a direction E (in FIGS. 5A to 5F, a counter-clockwise direction). When the cam gear 17 rotates approximately 90 degrees, as shown in FIG. 5B, the cam gear 17 starts to come into contact with the second cam receiving surface 15b of the slide cam 15. During a transition period (between FIGS. 5(a) and 5(b)) of the cam gear 17 from 0 degrees to a contact start position with the second cam receiving surface 15b, the slide cam 15 does not move and the colorimetric unit 10 remains at a separation position where the colorimetric unit 10 is separated from the colorimetric surface Z.

In other words, there is an idle period in which drive is not transmitted from the rotating cam 170 to the slide cam 15 after the colorimetric unit 10 reaches the separation position (the second position).

During this period, as shown in FIG. 6A, the colorimetric unit 10 is configured so as to be biased in the contact direction X by a biasing member (not shown) and prevented from moving in a left-right direction in FIGS. 6A to 6F by a guide section (not shown).

When the cam gear 17 rotates further, the top cam surface 17a of the rotating cam 170 starts pressing the second cam receiving surface 15b of the cam receiving section (a period from FIG. 5B to 5(c)), and the slide cam 15 starts to move in a forward movement direction F. The forward movement direction F is a direction in which the cam main body section 150 of the slide cam 15 moves in a direction of separation from the rotating shaft of the cam gear 17.

When a driving force from the cam gear 17 starts to be transmitted to the slide cam 15, as shown in FIG. 6C, the contact region 13a mounts the click section 15f at the boundary between the first surface 15e1 of the slide piece 15e and the inclined surface 15c. Accordingly, the colorimetric unit 10 is pushed upward in an opposite direction to the contact direction X. The click section 15f is provided for the purpose of holding the colorimetric unit 10 at the separation position and acts to restrict movement of the slide cam 15 when the slide cam 15 starts to move due to external force instead of due to being driven by the cam gear 17. In other words, in order to move the slide cam 15, the contact region 13a of the engagement piece 130 provided in the colorimeter base 13 must clear the click section 15f against a biasing force of the biasing member 18, and the colorimetric unit 10 is held at the separation position using the resistance force.

When the click section 15f passes the contact region 13a of the engagement piece 130 of the colorimetric unit 10, as shown in FIG. 6B, the contact region 13a of the colorimeter base 13 moves from the first surface 15e1 to the inclined surface 15c. In addition, due to the biasing force of the biasing member 18, a component force is generated with which the contact region 13a presses the inclined surface 15c in the forward movement direction F. Accordingly, the slide cam 15 is released from the driving force of the cam gear 17, and a relationship between the slide cam 15 and the cam gear 17 changes to a state where the top cam surface 17a of the rotating cam 170 is separated from the second cam receiving surface 15b as shown in FIG. 5C. At this point, with respect to the slide cam 15 and the colorimetric unit 10, the front surface 12b of the colorimetric unit 10 comes into contact with the colorimetric surface Z as shown in FIG. 6D. At this contact position Xl, the contact region 13a is separated from the first surface 15e1 that is closer to the transport surface of the slide cam 15, and the colorimetric unit 10 comes into contact with the colorimetric surface Z in a stable manner. Meanwhile, as the cam gear 17 rotates further and a rotational phase reaches 180 degrees, the top cam surface 17a of the rotating cam 170 comes into perpendicular contact with the second cam receiving surface 15b and the slide cam 15 reaches the forward movement limit in the forward movement direction (FIG. 5D).

At this point, a contact state of the colorimetric unit 10 is detected by a photosensor 19 shown in FIGS. 5A to 5F. There is a timing at which a light shielding section 15h of the slide cam 15 shields the photosensor 19 from light during a transition from the separation position shown in FIG. 5A to the contact position shown in FIG. 5D, and a position where the cam gear 17 has been rotated by a certain phase from the timing is determined as a contact state. A detailed description will be given later.

Description of Operation from Contact Position to Separation Position

First, an operation when the colorimetric unit 10 makes a transition from the contact position to the separation position will be described.

When making a transition to the separation position after colorimetry or the like is completed, the motor 20 is rotationally driven. Even in this case, rotation occurs in the same direction E as when a transition is made from the separation position to the contact position. In other words, the drivingly connected cam gear 17 rotates in the direction E shown in FIGS. 5A to 5F. In the present embodiment, by constantly rotating the motor 20 in one direction (the direction E)

instead of driving the motor 20 in reverse, a circuit configuration for motor control is simplified and cost reduction is achieved. In other words, only rotational drive in one direction is imparted to the rotating cam 170 from the motor 20.

When the cam gear 17 rotates and reaches a state shown in FIG. 5E, the top cam surface 17a of the rotating cam 170 starts to come into contact with the first cam receiving surface 15a of the slide cam 15. Subsequently, the cam gear 17 reaches a state shown in FIG. 5F (the first dead center). The state at this point is equivalent to that shown in FIG. 5A.

Meanwhile, the slide cam 15 does not move during a period of transition from FIG. 5D to FIG. 5E or, in other words, until a rotational phase exceeds 270 degrees by a prescribed amount from 180 degrees and the cam gear 17 comes into contact with the first cam receiving surface 15a. Therefore, there is an idle period in which drive is not transmitted from the rotating cam 170 to the slide cam 15 after the colorimetric unit 10 reaches the contact position (the first position).

At this point, the colorimetric unit 10 is biased in the contact direction X shown in FIGS. 5A to 5F by the biasing member 18 and the biasing force creates a state where the front surface 12b of the colorimeter cover 12 is in contact with the colorimetric surface Z. In this case, the colorimetric surface Z changes depending on whether the recording material P is present or absent. In other words, the colorimetric surface Z is a surface of the recording material P when an object of colorimetry is the recording material P but the colorimetric surface Z is a surface of the white reference plate 30 when the recording material P is not present.

When the cam gear 17 rotates and the top cam surface 17a of the rotating cam 170 presses the first cam receiving surface 15a of the slide cam 15 during a period from FIG. 5E to 5(f), the slide cam 15 starts to slidingly move in the backward movement direction H which is opposite to the forward movement direction F.

When drive from the cam gear 17 starts to be transmitted to the slide cam 15, the inclined surface 15c of the slide cam 15 shown in FIG. 6E presses the contact region 13a of the engagement piece 130 of the colorimetric unit 10 and pushes up the colorimetric unit 10 in an opposite direction (the separation direction) to the contact direction X. Due to the biasing force of the biasing member 18, a component force with which the contact region 13a of the colorimeter base 13 presses the inclined surface 15c in the forward movement direction F is generated on the contact region 13a. Since the component force constitutes resistance to the cam gear 17, the cam gear 17 moves the slide cam 15 in the backward movement direction H against a resistance force that acts in the forward movement direction F. In other words, the slide cam 15 moves while being controlled by the top cam surface 17a of the rotating cam 170. Subsequently, when the cam gear 17 rotates and the contact region 13a of the engagement piece 130 clears the click section 15f of the slide cam 15, the colorimetric unit 10 reaches a separation position shown in FIG. 6F (FIG. 6A).

As described above, the biasing member 18 which biases the colorimetric unit 10 in the contact direction, the motor 20, the cam gear 17, and the slide cam 15 constitute a unit drive portion (an apparatus main body drive portion) according to the present invention. Among these components, the cam gear 17 and the slide cam 15 constitute the cam mechanism which causes the colorimetric unit 10 to reciprocate between the contact position (the first position) and the separation position (the second position). In addition, when the colorimetric unit 10 is at the contact position (the first position), the colorimetric unit 10 is pressed against the recording material P by the biasing member 18. Furthermore, when the colorimetric unit 10 is at the separation position (the second position), the colorimetric unit 10 is held at the separation position against the pressing force of the biasing member 18 by the slide cam 15 and the rotating cam 170 of the cam gear 17 which constitute the cam mechanism.

Description of Operation of Shutter

Next, an operation of the shutter 14 of the colorimetric unit 10 will be described with reference to FIGS. 7A to 7E. FIGS. 7A to 7E are diagrams which show phases of the cam gear 17 and the slide cam 15 and an operation of the shutter 14 and which is viewed from a surface on a side of the colorimetric window in FIG. 1A in a similar manner to FIGS. 5A to 5F.

Figure 7A:
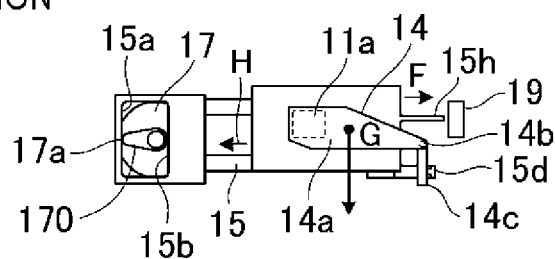
FIGS. 7A to 7E are schematic views representing a relationship between the cam gear, the slide cam, and a shutter shown in FIGS. 1A and 1B.

Shutter 14 when Colorimetric Unit 10 Makes Transition from Separation Position to Contact Position When the colorimetric unit 10 is at the separation position, as shown in FIG. 7A, the light shielding surface section 14a of the shutter 14 is arranged so as to close the colorimetric window 11a of the colorimeter 11 which is a reading section of the colorimetric unit 10. The state at this point will be referred to as a shutter closed state. The shutter 14 is rotatably held by the colorimeter base 13 around a center of rotation of the spindle 14b, and a biasing force due to the shutter's own weight is applied in a direction indicated by an arrow to a center of gravity G of the shutter 14. In the state shown in FIG. 7A, a rotating force of the shutter 14 created by its own weight is held due to the lever 14c fixed to the spindle 14b of the shutter 14 coming into contact with the shutter pressing section 15d of the slide cam 15.

Figure 7B:
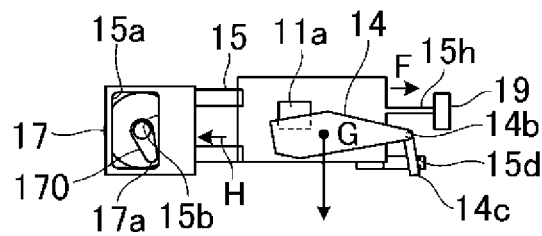
Figure 7C:
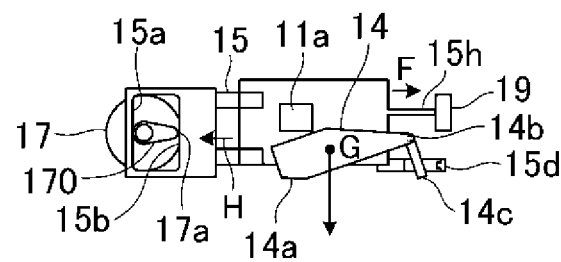
Figure 7D:
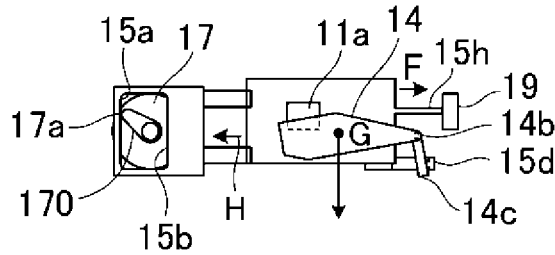
Figure 7E:
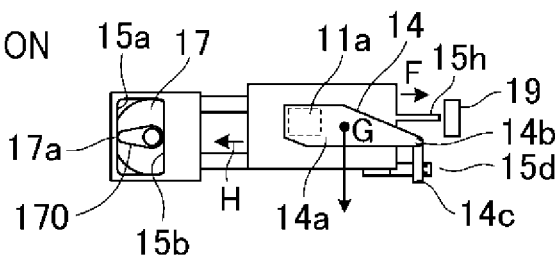

Subsequently, as the slide cam 15 moves in the forward movement direction F in accordance with a rotation of the cam gear 17, the colorimetric window 11a is gradually exposed and changes to a state shown in FIG. 7B before reaching a state shown in FIG. 7C. When the state shown in FIG. 7C is reached, the shutter 14 is held as a receiving surface 14d comes into contact with an abutted section (not shown) and the colorimetric window 11a enters a fully open state in which the colorimetric window 11a is completely exposed. This fully open state will be referred to as a shutter open state. In other words, when the colorimetric unit 10 is in a contact state, the shutter open state exists.

As described above, the motor 20, the cam gear 17, the slide cam 15, and the shutter pressing section 15d provided in the slide cam 15 constitute the shutter drive portion (the opening/closing member drive portion) according to the present invention. In other words, the shutter drive portion and the unit drive portion are driven by the motor 20 that is the same driving source.

In addition, the shutter 14 is biased in an opening direction by its own weight, and the shutter drive portion is configured to perform driving only in an opposite direction to the biasing direction of the shutter 14 or, in this example, only in a closing direction. Alternatively, the shutter 14 may be biased in the closing direction by its own weight and the shutter drive portion may be configured to perform driving only in the opening direction.

Shutter 14 when Colorimetric Unit 10 Makes Transition from Contact Position to Separation Position Next, an operation of the shutter 14 when the colorimetric unit 10 makes a transition from the contact position to the separation position will be described with reference to FIGS. 7A to 7E.

When the colorimetric unit 10 is at the contact position, as shown in FIG. 7C, the shutter open state exists in which the light shielding surface section 14a of the shutter 14 has completely opened the colorimetric window 11a of the colorimeter 11 that is the reading section of the colorimetric unit 10. In the state shown in FIG. 7C, the rotating force of the shutter 14 created by its own weight is held due to the receiving surface 14d coming into contact with the abutted section (not shown). Subsequently, as the slide cam 15 moves in the direction H in accordance with a rotation of the cam gear 17, the colorimetric window 11a is gradually closed and changes to a state shown in FIG. 7D before reaching a state shown in FIG. 7E (FIG. 7A).

At this point, the colorimetric unit 10 is in a separation state, and the shutter closed state exists in which the light shielding surface section 14a of the shutter 14 has completely closed the colorimetric window 11a of the colorimeter 11 that is the reading section of the colorimetric unit 10. A degree of opening of the colorimetric window 11a by the light shielding surface section 14a of the shutter 14 including the shutter open state and the shutter closed state described above will be defined as a degree of shutter opening.

Figure 8:
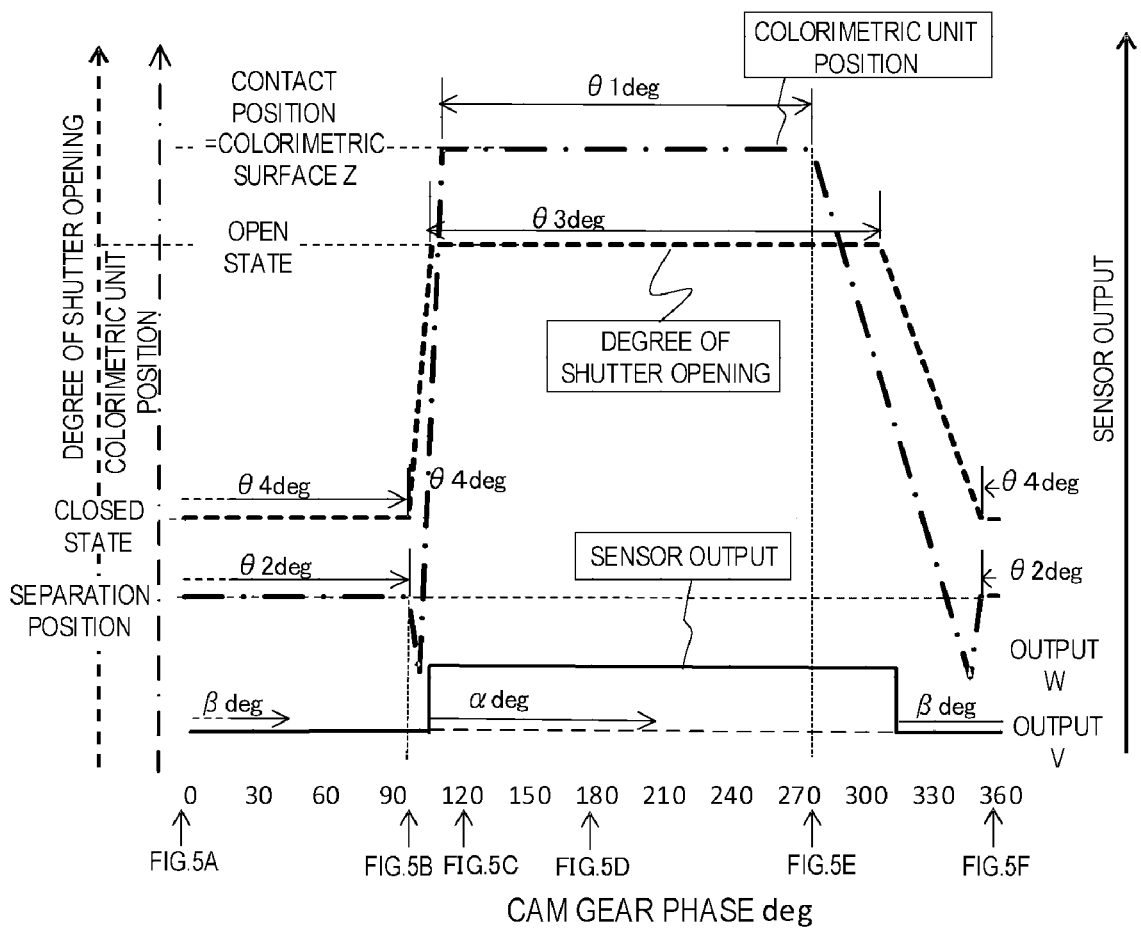
FIG. 8 is a diagram showing a relationship between a phase of the cam gear, a position of the colorimetric unit, and a degree of shutter opening shown in FIGS. 1A and 1B.

FIG. 8 collectively shows a relationship among a rotational phase of the cam gear 17, a position of the colorimetric unit 10, and the degree of shutter opening described above. In the diagram, an abscissa indicates a phase of the cam gear 17 and an ordinate indicates a position of the colorimetric unit 10 and the degree of shutter opening.

Means for detecting a contact position and a separation position of the colorimetric unit 10 will now be described.

As described earlier, the slide cam 15 moves in the direction F when the colorimetric unit 10 makes a transition from the separation position in FIG. 5A to the contact position in FIG. 5C, and an output of W is obtained from the sensor 19 as shown in FIG. 8 at a timing where the light shielding section 15h shields the sensor 19. In the present embodiment, at a timing where the cam gear 17 has rotated by a prescribed phase αdeg from the timing where the sensor 19 is shielded, a determination is made that the colorimetric unit 10 has moved to the contact position and the shutter 14 has changed to an open state. The prescribed phase αdeg is set to an angle in a range of θ1deg at which the colorimetric unit 10 is at the contact position and in a range of θ3deg at which the shutter 14 is in the open state.

Next, the slide cam 15 moves in the backward movement direction H during a transition from the contact position in FIG. 5D to the separation position in FIG. 5F, and an output of V is obtained from the sensor 19 as shown in FIG. 8 at a timing where the light shielding section 15h separates from the sensor 19.

At a timing where the cam gear 17 has rotated by a prescribed phase βdeg from the timing where the sensor becomes transmissive, a determination is made that the colorimetric unit 10 has moved to the separation position and the shutter 14 has changed to a closed state. The prescribed phase βdeg is set to an angle in a range of θ2deg at which the colorimetric unit 10 is at the separation position and in a range of θ4deg at which the shutter 14 is in the closed state.

As described above, phases of the cam gear 17 when the colorimetric unit 10 is at the contact position and the separation position respectively exist with widths of θ1 and θ2. In addition, phases of the cam gear 17 in the shutter open state and the shutter closed state also respectively exist with widths of θ3 and θ4. Accordingly, stop positions (αdeg from the sensor output W and βdeg from the sensor output V) of the motor 20 which is the driving source that performs a contacting/separating operation of the colorimetric unit 10 and an opening/closing operation of the shutter 14 can be roughly set and control can be simplified.

In the present embodiment, a DC brush motor is used as the motor 20. DC brush motors are inexpensive but rotational speeds thereof characteristically vary according to load torque. In other words, the lighter the load torque, the faster the rotation, and the heavier the load torque, the slower the rotation.

Figure 9:
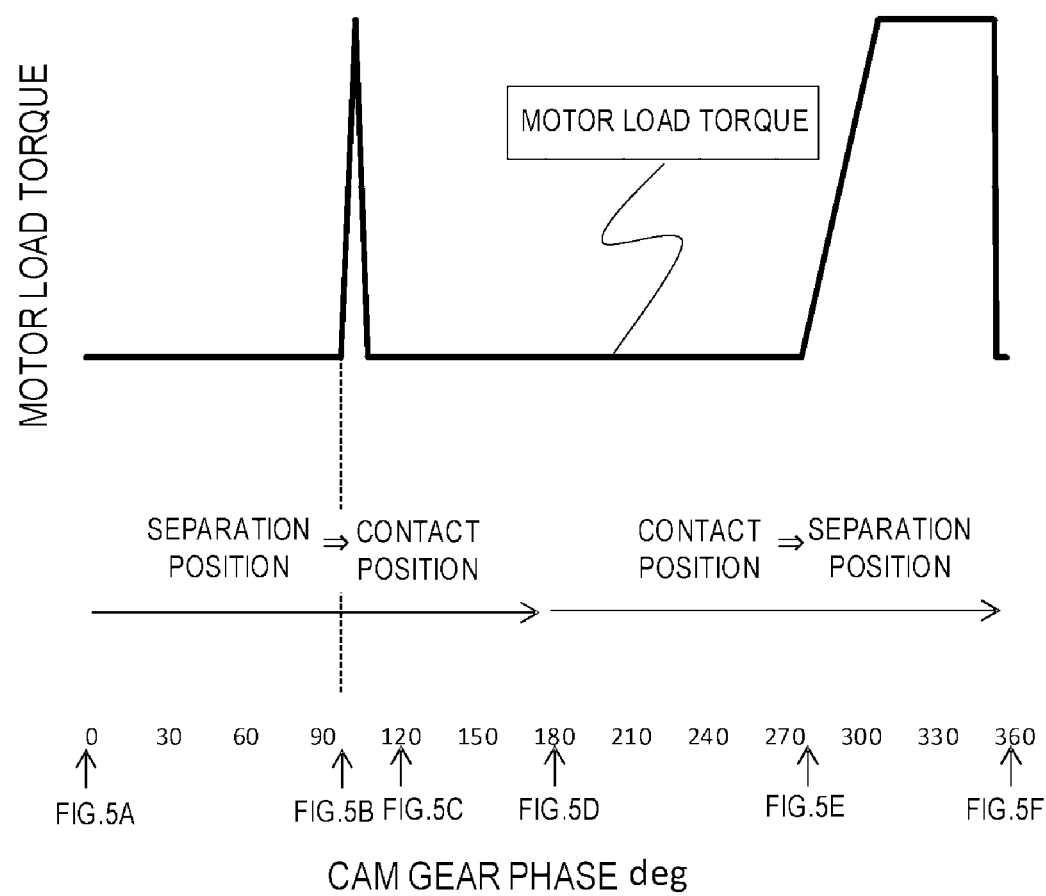
FIG. 9 is a diagram showing a relationship between a phase of the cam gear shown in FIGS. 1A and 1B and a load torque of a motor.

FIG. 9 is a diagram showing a relationship between a phase of the cam gear 17 and a load torque applied to the motor 20 according to the present embodiment. An abscissa indicates a phase of the cam gear 17 and an ordinate indicates a load torque of the motor 20.

As shown in FIG. 9, a manner in which load torque varies differs between a transition of the colorimetric unit 10 from the separation position to the contact position and a transition from the contact position to the separation position. This means that more time is required by the cam gear 17 to rotate from 180 degrees to 360 degrees than to rotate by 180 degrees from 0 degrees which is the state shown in FIG. 5A.

In other words, the time required for a transition from the separation position to the contact position differs from the time required for a transition from the contact position to the separation position. Therefore, even if the torque applied to the motor varies through repetitive contacting/separating operations, as described above, leeway is given to the phase of the cam gear 17 when the colorimetric unit 10 is at the contact position and the separation position and when the shutter 14 is in the open state and the closed state. As a result, a variation in a rotation time of the cam gear 17 due to the torque variation can be absorbed and the colorimetric unit 10 and the shutter 14 can be stopped at prescribed positions.

As described above, according to the present embodiment, by providing both an opening/closing mechanism of the shutter 14 which protects the colorimeter 11 of the colorimetric unit 10 and a contact/separation mechanism of the colorimetric unit 10 with respect to the recording material P, contamination of a reading section can be prevented while improving detection accuracy of the recording material P and maintaining transportability when reading is not being performed.

In addition, since an opening/closing operation of the shutter 14 and the contacting/separating operation of the colorimetric unit 10 can be performed in an interlocked manner by one motor 20 (an actuator), control of a contact/separation state of the colorimetric unit 10 and control of an open/closed state of the shutter 14 can be performed using the same components and operation timings of the colorimetric unit 10 and the shutter 14 can be controlled with accuracy. Furthermore, consolidating actuators into one motor 20 is also advantageous in terms of saving space.

Second Embodiment

Next, a second embodiment of the present invention will be described with reference to FIGS. 10 and 11. In the present embodiment, since basic configurations of an image forming apparatus to which the present invention is applied and a colorimetric unit provided in the image forming apparatus are the same as those of the first embodiment, same or corresponding functions to the first embodiment and elements sharing the same configuration as those of the first embodiment will be assigned same reference characters and a detailed description will be omitted.

Figure 10A:
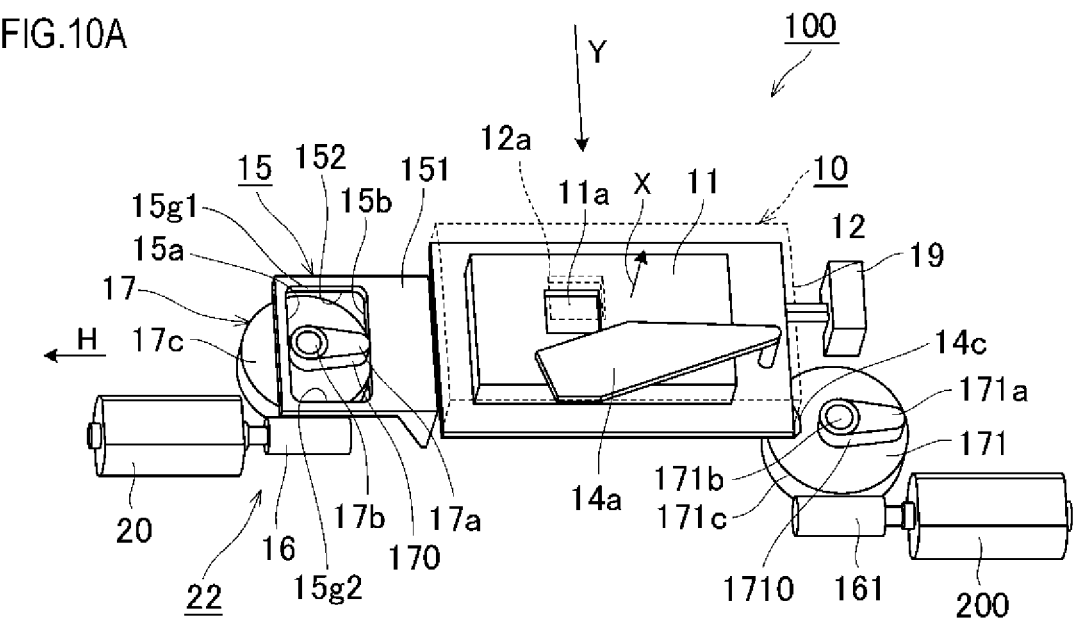
FIGS. 10A and 10B are schematic perspective views showing an actuating mechanism of a colorimetric unit according to a second embodiment of the present invention.
Figure 10B:
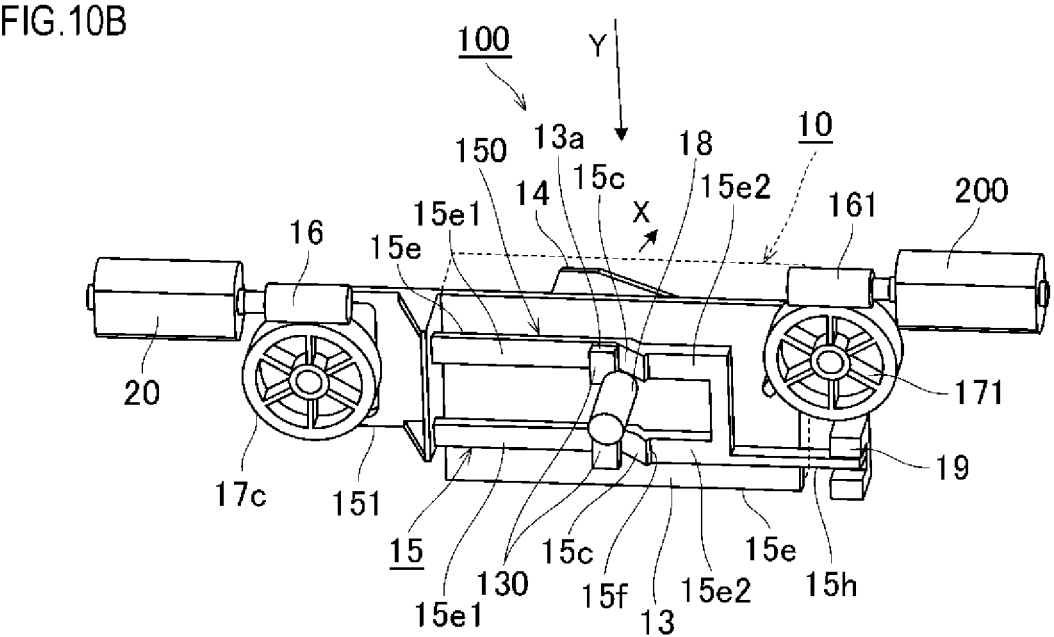

FIGS. 10(a) and 10(b) are configuration diagrams of the colorimetric unit, and FIGS. 11(a) to 11(e) are explanatory diagrams of operations of a cam gear, a slide cam, and a shutter, in which the contacting/separating operation of the colorimetric unit and the opening/closing operation of the shutter according to the first embodiment are driven by two actuators, namely, motors 20 and 200.

As shown in FIGS. 10A and 10B, the contacting/separating operation of the colorimetric unit 10 is performed via the worm 16, the cam gear 17, and the slide cam 15 using the motor 20 in a similar manner to the first embodiment. Meanwhile, the shutter 14 is configured to be opened and closed using the motor 200, via a worm 161 mounted on an output shaft of the motor 200 and a cam gear 171 which rotates by meshing with the worm 161, and due to driving by the cam gear 171. The cam gear 171 is configured such that a worm wheel 171c which meshes with the worm 161 and constitutes a worm gear and a rotating cam 1710 are integrated by a common rotating shaft 17b, and the rotating cam 1710 is rotated by rotation of the worm wheel 17c.

In other words, the movement of the colorimetric unit 10 and the opening/closing operation of the shutter 14 are made independent, and a shutter drive portion and a unit drive portion are respectively driven by the motors 20 and 200 that are different driving sources.

Figure 11A:
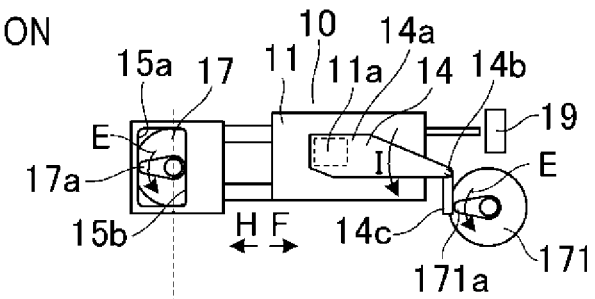
FIGS. 11A to 11E are schematic views representing a relationship between a cam gear, a slide cam, and a shutter shown in FIGS. 10A and 10B.
Figure 11B:
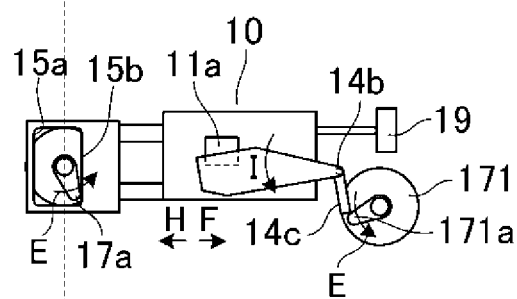
Figure 11C:
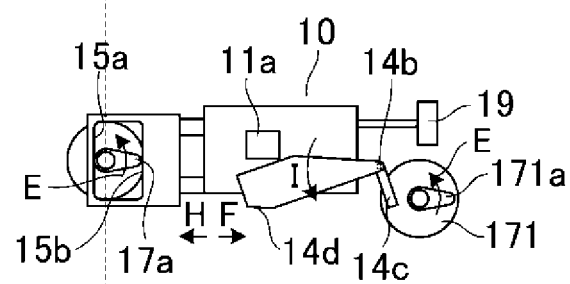

Description of Operation from Shutter Closed State to Open State (FIGS. 11(a) to 11(c))

First, a movement of the shutter 14 when the colorimetric unit 10 makes a transition from the separation position to the contact position will be described.

FIGS. 11A to 11E are diagrams showing phases of the cam gear 171 and the slide cam 15 and a movement of the shutter 14. When the colorimetric unit 10 is at the separation position, as shown in FIG. 11A, the shutter 14 is arranged so as to close the colorimetric window 11a that is the reading section of the colorimetric unit 10. At this point, the shutter 14 is held in a closed state by bringing a cam surface 171a of the cam gear 171 into contact with the lever 14c. Subsequently, a driving force is transmitted from the motor 200 to the cam gear 171 and, as the cam gear 171 rotates in the direction E, a contact state between a top cam surface 171a of the cam gear 171 and the lever 14c is transformed. Due to the transformation, the shutter 14 rotates in a direction I by its own weight, the colorimetric window 11a is gradually exposed, and the shutter 14 changes to a state shown in FIG. 11B before reaching a state shown in FIG. 11C.

When the state shown in FIG. 11C is reached, the lever 14c of the shutter 14 and the top cam surface 171a of the cam gear 171 are in a completely separated state, and the colorimetric window 11a enters a fully-open state in which the colorimetric window 11a is completely exposed as the receiving surface 14d comes into contact with an abutted section (not shown). This fully open state will be referred to as a shutter open state. In other words, when the colorimetric unit 10 is in a contact state, the shutter open state exists.

Figure 11D:
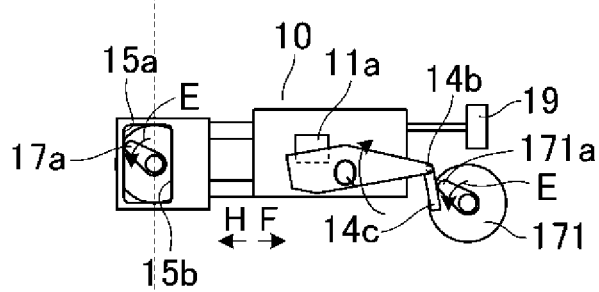
Figure 11E:
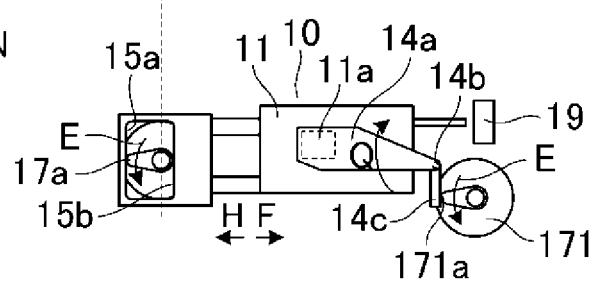

Description of Operation from Shutter Open State to Closed State (FIGS. 11(c) to 11(e))

Next, a movement of the shutter 14 when the colorimetric unit 10 makes a transition from the contact position to the separation position will be described.

When the colorimetric unit 10 is at the contact position, as shown in FIG. 11C, the shutter open state exists in which the shutter 14 has completely opened the colorimetric window 11a of the colorimetric unit 10. In the state shown in FIG. 11C, the shutter 14 is held by having the receiving surface 14d come into contact with the abutted section (not shown) due to a rotating force created by the shutter's own weight. Subsequently, in accordance with the rotation of the cam gear 171 in the direction E, the cam surface 171a of the cam gear 171 starts to come into contact with the lever 14c of the shutter 14 and rotates the shutter 14 in a direction Q. The colorimetric window 11a is gradually closed and changes to a state shown in FIG. 11D before reaching a state shown in FIG. 11E (FIG. 11A). At this point, the colorimetric unit 10 is in a separation state, and the shutter 14 is in a shutter closed state in which the colorimetric window 11a of the colorimeter 11 of the colorimetric unit 10 is completely closed by the shutter 14.

In this manner, both the opening/closing mechanism of the shutter 14 which protects the colorimeter 11 of the colorimetric unit 10 and the contact/separation mechanism of the colorimetric unit 10 with respect to the recording material are provided, and the respective mechanisms are driven by the two motors 20 and 200. In addition, by interlocking drive timings, contamination of the colorimeter 11 can be prevented while improving detection accuracy of the recording material P and maintaining transportability when reading is not being performed.

Furthermore, while motors are used as actuators in the present embodiment, the use of motors is not restrictive and other actuators such as solenoids, clutches, and the like may be used.

Third Embodiment

Next, a third embodiment of the present invention will be described with reference to FIGS. 12 to 14. Even in the present embodiment, since basic configurations of an image forming apparatus to which the present invention is applied and a colorimetric unit provided in the image forming apparatus are the same as those of the first embodiment, same or corresponding functions to the first embodiment and elements sharing the same configuration as those of the first embodiment will be assigned same reference characters and a detailed description will be omitted.

Figure 12:
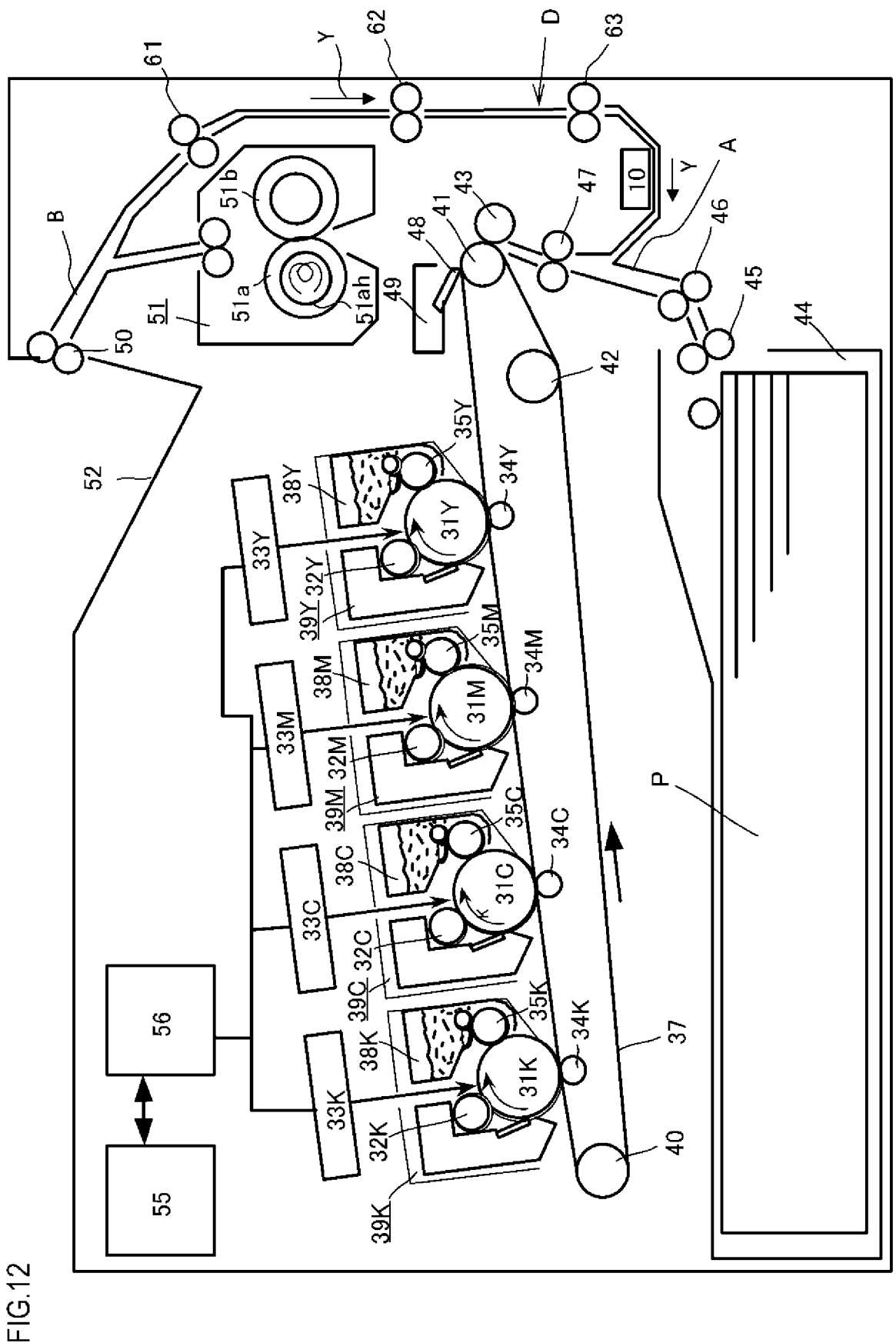
FIG. 12 is a schematic sectional view of an image forming apparatus according to a third embodiment of the present invention.
Figure 13A:
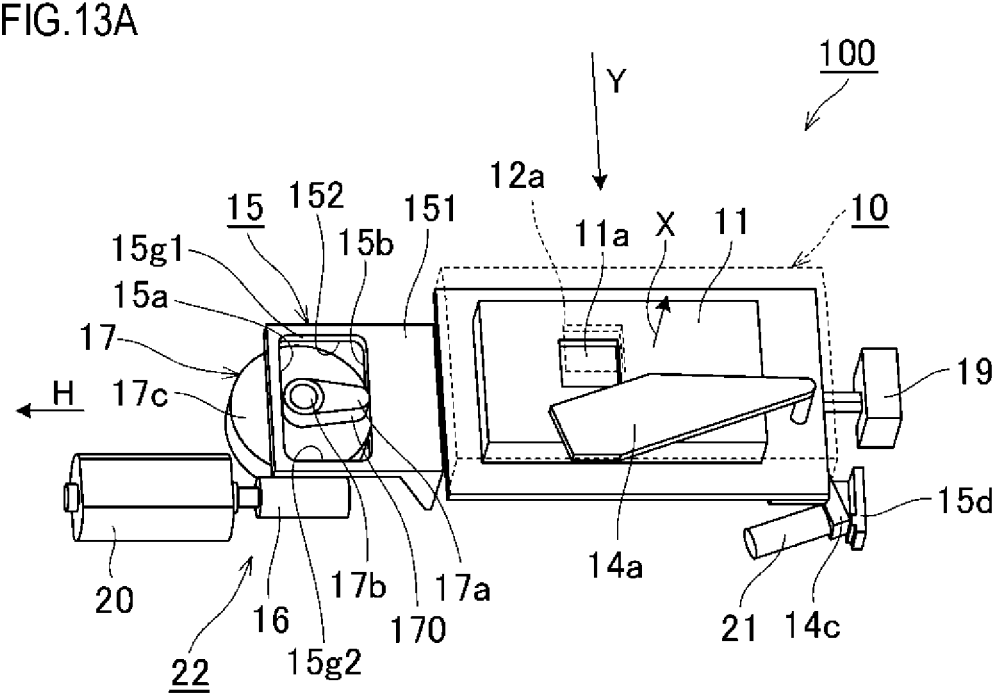
FIGS. 13A and 13B are schematic perspective views showing an actuating mechanism of a colorimetric unit according to the third embodiment of the present invention.
Figure 13B:
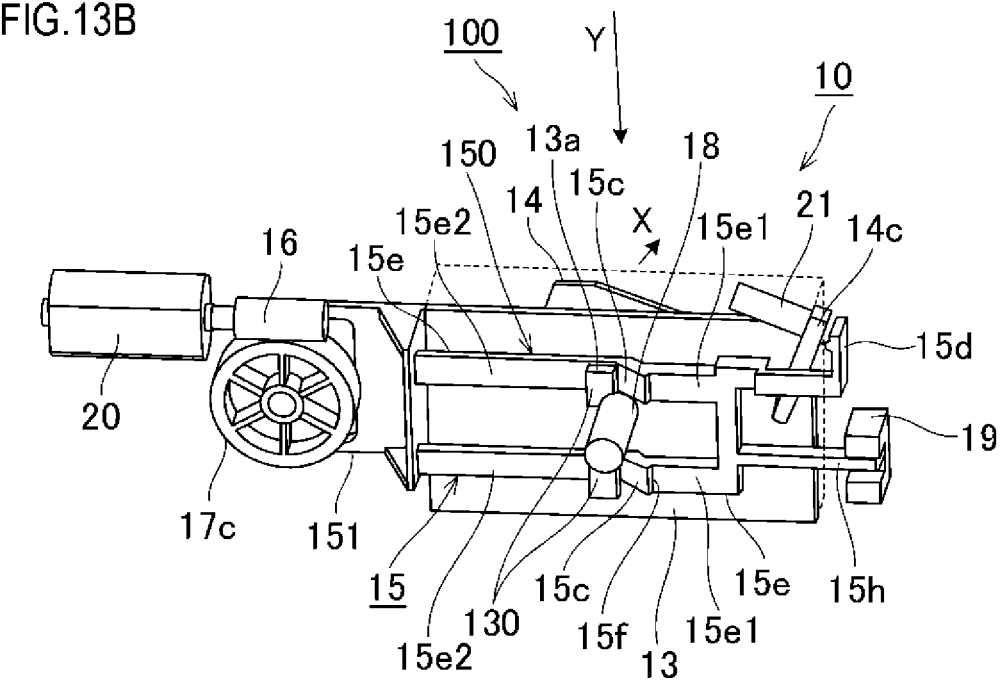

FIG. 12 is a sectional view of an image forming apparatus according to the third embodiment of the present invention, FIGS. 13(a) and 13(b) are configuration diagrams of a colorimetric unit, and FIGS. 14(a) to 14(e) are explanatory diagrams of operations of a cam gear, a slide cam, and a shutter. An arrangement of the colorimetric unit relative to the transport path and an opening/closing configuration of the shutter have been changed from the first embodiment.

As shown in FIG. 12, the present embodiment adopts a configuration in which the colorimetric unit 10 is provided at a location where the duplex transport path D is horizontal and the recording material P is transported below the colorimetric unit 10. In addition, as shown in FIGS. 13(a) and 13(b), an opening/closing operation of the shutter 14 is controlled by a shutter biasing member 21 which is the second biasing member that biases the shutter 14 and by the slide cam 15.

Figure 14A:
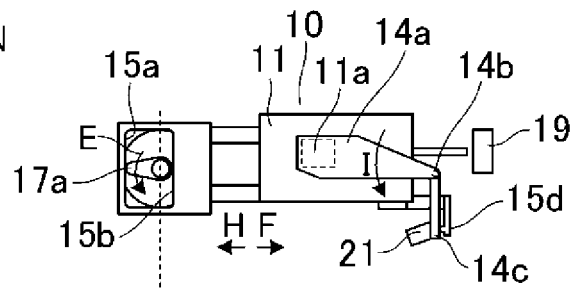
FIGS. 14A to 14E are schematic views representing a relationship between a cam gear, a slide cam, and a shutter shown in FIGS. 13A and 13B.
Figure 14B:
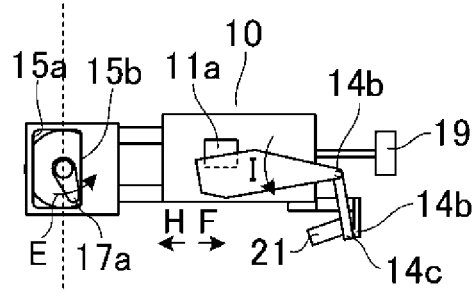

Description of Operation from Shutter Closed State to Open State (FIGS. 14(a) to 11(c))

First, a movement of the shutter 14 when the colorimetric unit 10 makes a transition from the separation position to the contact position will be described. FIGS. 14A to 14E are diagrams showing phases of the cam gear 17 and the slide cam 15 and a movement of the shutter 14.

When the colorimetric unit 10 is at the separation position, as shown in FIG. 14A, the shutter 14 is arranged so as to close the colorimetric window 11a that is the reading section of the colorimetric unit 10. The shutter 14 is held so as to be rotatable around the spindle 14b, and the lever 14c is subjected to a biasing force in a direction of an arrow I from the shutter biasing member 21. In the state shown in FIG. 14A, a rotating force due to the biasing force from the shutter biasing member 21 is held due to the lever 14c of the shutter 14 coming into contact with the shutter pressing section 15d of the slide cam 15.

Subsequently, as the cam gear 17 rotates, the slide cam 15 moves in the direction F and the shutter 14 receives a force from the shutter biasing member 21 and rotates in the direction I. Due to the rotation, the colorimetric window 11a is gradually exposed and the shutter 14 changes to a state shown in FIG. 14B before reaching a state shown in FIG. 14C.

Figure 14C:
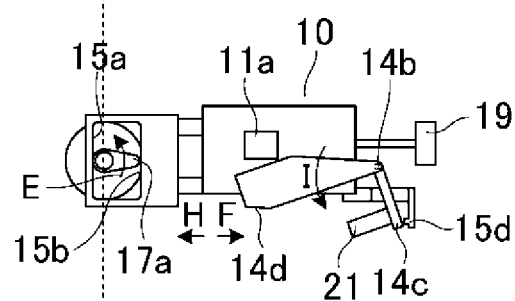

When the state shown in FIG. 14C is reached, as the receiving surface 14d of the shutter 14 comes into contact with an abutted section (not shown), the colorimetric window 11a enters a fully-open state in which the colorimetric window 11a is completely exposed. This fully open state will be referred to as a shutter open state. In other words, when the colorimetric unit 10 is in a contact state, the shutter open state exists.

Figure 14D:
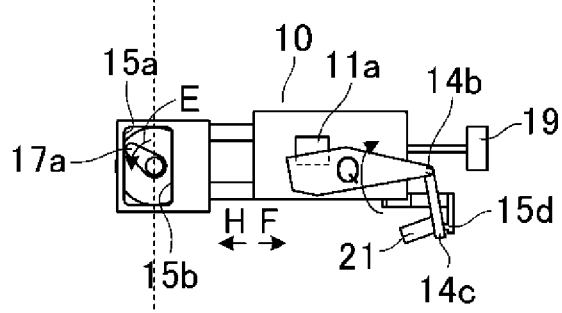
Figure 14E:
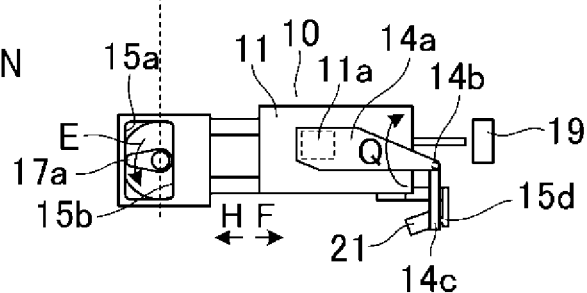
Figure 17A:
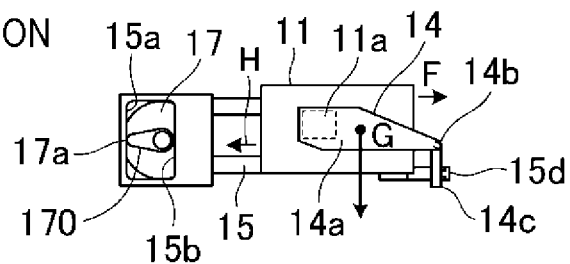
FIGS. 17A to 17E is a schematic view representing a relationship between the cam gear, the slide cam, and a shutter according to the fourth embodiment of the present invention.
Figure 17B:
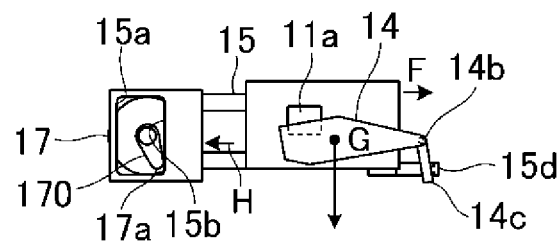
Figure 17C:
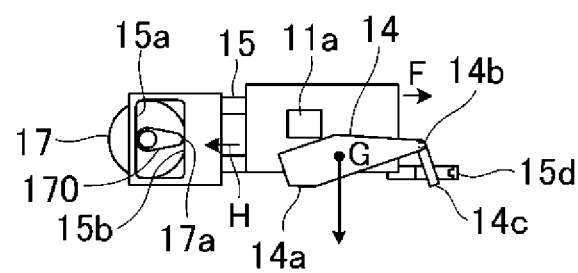
Figure 17D:
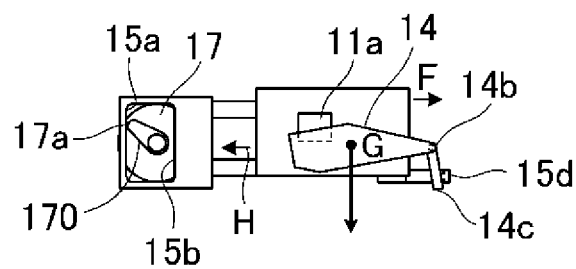
Figure 17E:
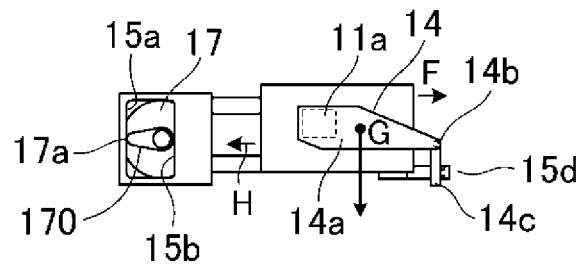

Description of Operation from Shutter Open State to Closed State (FIGS. 14(c) to 14(e))

Next, a movement of the shutter 14 when the colorimetric unit 10 makes a transition from the contact position to the separation position will be described.

When the colorimetric unit 10 is at the contact position, as shown in FIG. 14C, the shutter open state exists in which the shutter 14 has completely opened the colorimetric window 11a of the colorimetric unit 10. In the state shown in FIG. 14C, the shutter 14 is held due to the rotating force created by the biasing force from the shutter biasing member 21 causing the receiving surface 14d to come into contact with the abutted section (not shown). Subsequently, as the cam gear 17 rotates, the slide cam 15 moves in the direction H and the shutter 14 receives a force from the shutter pressing section 15d of the slide cam 15 and rotates in the direction Q. Due to the rotation of the shutter 14, the colorimetric window 11a is gradually closed and changes to a state shown in FIG. 14D before reaching a state shown in FIG. 14E (FIG. 14A). At this point, the colorimetric unit 10 is in a separation state, and the shutter closed state exists in which the shutter 14 has completely closed the colorimetric window 11a that is the reading section of the colorimetric unit 10.

In this manner, by restricting an operation of the shutter 14 according to the third embodiment by the slide cam 15 and the shutter biasing member 21, the colorimetric unit 10 can be controlled without being affected by an installation direction of the colorimetric unit 10 and similar effects to the first embodiment can be obtained.

As described above, while an interlocked operation of the colorimetric unit and the shutter has been described using a slide cam in the first to third embodiments, the present invention is not limited thereto and may be applied to, for example, operations using a rotating cam. In addition, biasing means, biasing directions, and the like in an opening direction of the shutter as described in the embodiments simply represent examples and any configuration may be adopted as long as requirements of the present invention are satisfied.

Moreover, while a colorimetric unit that performs colorimetry of a color patch image has been described as an example of a colorimetric apparatus in the respective embodiments presented above, a colorimetric unit that performs colorimetry of a black and white patch image may be used instead. In addition, the detecting apparatus may be used in a so-called media sensor that is an imaging apparatus which captures an image of surface properties of a recording material and which determines a type of the recording material or the like instead of performing colorimetry of a patch image.

Fourth Embodiment

In the first to third embodiments described above, detecting means for detecting an open/closed state of the shutter 14 in the colorimetric unit 10 is separately provided for detecting whether the shutter 14 is open or closed. In addition, realizing an operation of moving the colorimetric unit 10 to the first position (the contact position) at which a recording material is pressed and the second position (the separation position) at which the pressing is released additionally requires detecting means for detecting a position of the colorimetric unit 10.

However, separately providing such detecting means causes cost to rise accordingly.

In consideration thereof, in the fourth embodiment, a detecting apparatus and an image forming apparatus will be described which are capable of detecting whether the opening/closing member is open or closed and detecting a position of an apparatus main body including a light emitting element and a light receiving element without having to newly add detecting means for detecting whether the opening/closing member is open or closed and detecting means for detecting a position of the apparatus main body.

In the present embodiment, since an image forming apparatus to which the present invention is applied, a colorimetric unit which constitutes a colorimetric apparatus provided in the image forming apparatus, and an actuating mechanism of the colorimetric unit are the same as those of the first embodiment, same or corresponding functions to the first embodiment and elements sharing the same configuration as those of the first embodiment will be assigned same reference characters and a detailed description will be omitted.

The colorimetric unit 10, the cam gear 17, the shutter 14, the slide cam 15, and the like which constitute a colorimetric apparatus 100 according to the present embodiment are, for the most part, the same as those of the first embodiment as described above. However, as is apparent from a comparison between FIGS. 5 to 7 which show operations of the shutter 14 and the colorimetric unit 10 in the first embodiment and FIGS. 15 to 17 which show operations of the shutter 14 and the colorimetric unit 10 in the present embodiment, the present embodiment differs from the first embodiment in that both the sensor 19 and the light shielding section 15h which shields the sensor 19 are not provided.

Figure 18:
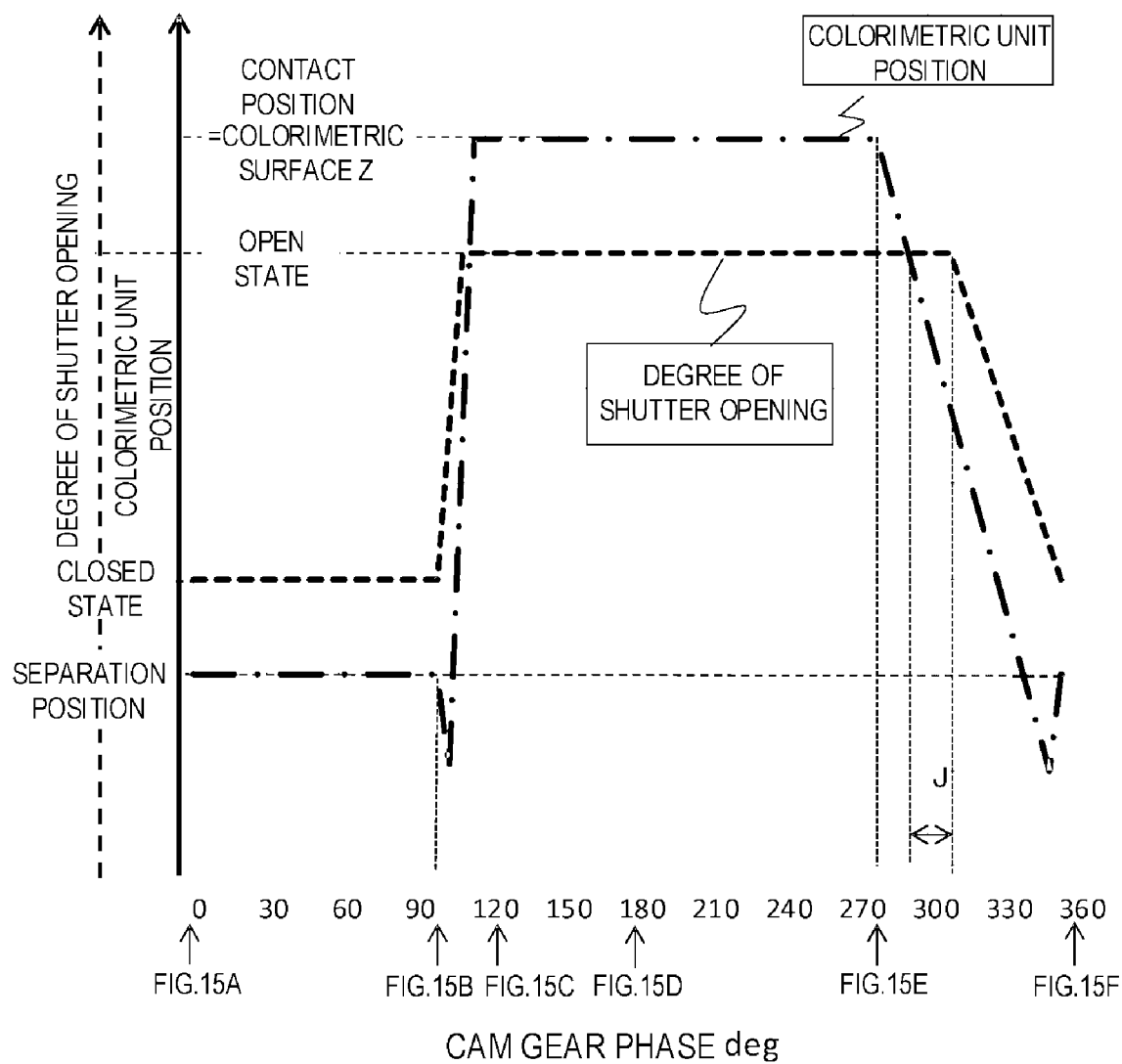
FIG. 18 is a diagram showing a relationship between a phase of the cam gear, a position of the colorimetric unit, and a degree of shutter opening according to the fourth embodiment of the present invention.

FIG. 18 collectively shows a relationship among a rotational phase of the cam gear 17, a position of the colorimetric unit 10, and the degree of shutter opening according to the present embodiment. In FIG. 18, an abscissa indicates a phase of the cam gear 17 and an ordinate indicates a position of the colorimetric unit 10 and the degree of shutter opening.

As shown in FIG. 18, in the present embodiment, phases of the cam gear 17 when the colorimetric unit 10 is at the contact position and the separation position respectively exist with widths in a similar manner to the first embodiment. In addition, phases of the cam gear 17 in the shutter open state and the shutter closed state also respectively exist with widths. Accordingly, stop positions of the motor 20 which performs a contacting/separating operation of the colorimetric unit 10 and an opening/closing operation of the shutter 14 can be roughly set and control can be simplified.

In addition, in the present embodiment, a DC brush motor is used as the motor 20 in a similar manner to the first embodiment. Since DC brush motors are inexpensive but rotational speeds characteristically vary according to load torque, the lighter the load torque, the faster the rotation, and the heavier the load torque, the slower the rotation.

Figure 19:
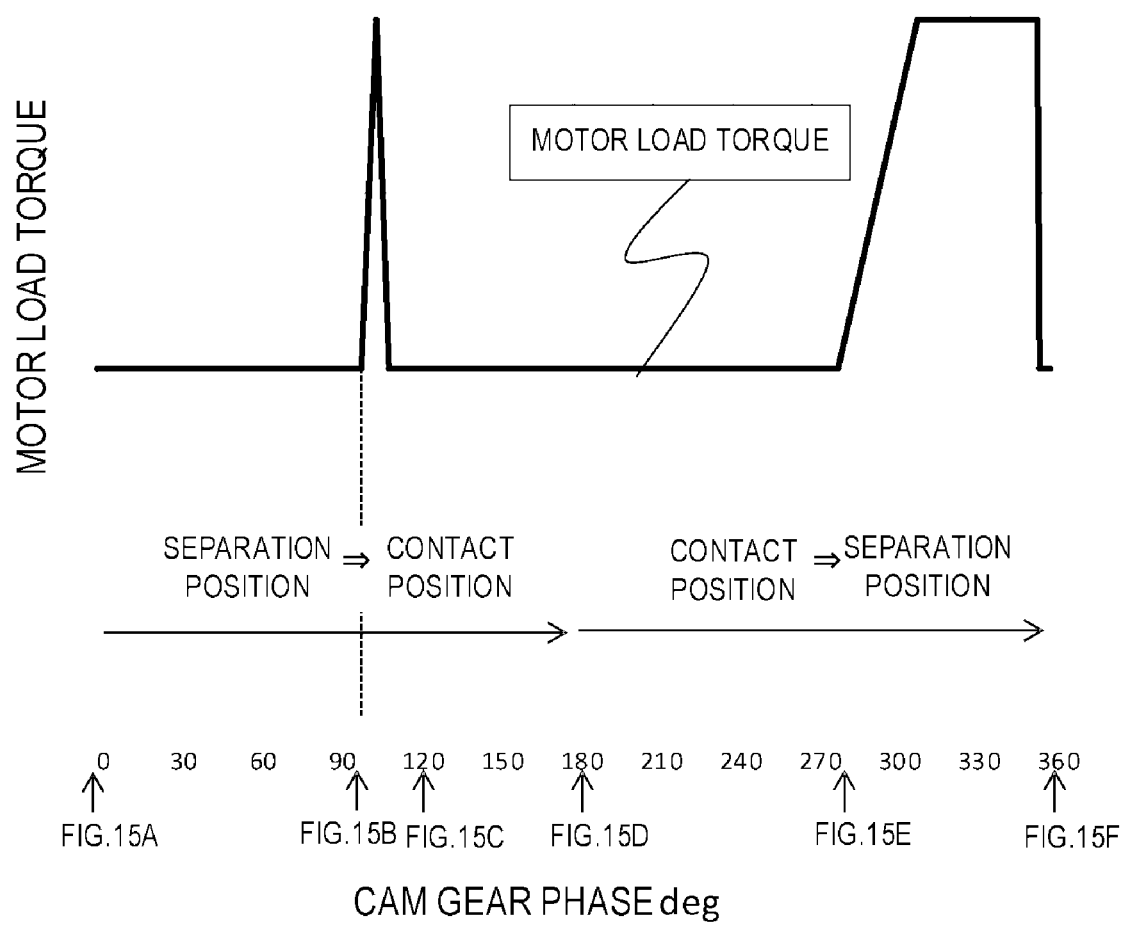
FIG. 19 is a diagram showing a relationship between a phase of the cam gear and a load torque of a motor according to the fourth embodiment of the present invention.

FIG. 19 shows a relationship between a phase of the cam gear 17 and a load torque applied to the motor 20 according to the present embodiment. In a similar manner to the first embodiment, an abscissa indicates a phase of the cam gear 17 and an ordinate indicates a load torque of the motor 20.

As shown in FIG. 19, a manner in which a load torque varies differs between a transition of the colorimetric unit 10 from the separation position to the contact position and a transition from the contact position to the separation position. This means that more time is required by the cam gear 17 to rotate from 180 degrees to 360 degrees than to rotate by 180 degrees from 0 degrees which is the state shown in FIG. 15A. In other words, a longer time is required for a transition from the contact position to the separation position than a transition from the separation position to the contact position.

In the actuating mechanism of the colorimetric unit 10 according to the present embodiment described above, a sensor or the like for detecting phases of the cam gear 17, the slide cam 15, the shutter 14, and the like is not provided unlike in the first to third embodiments.

Hereinafter, means for detecting a contact position and a separation position of the colorimetric unit 10 and opening and closing of the shutter 14 in the present embodiment will be described with reference to FIGS. 20 to 22.

Figure 20:
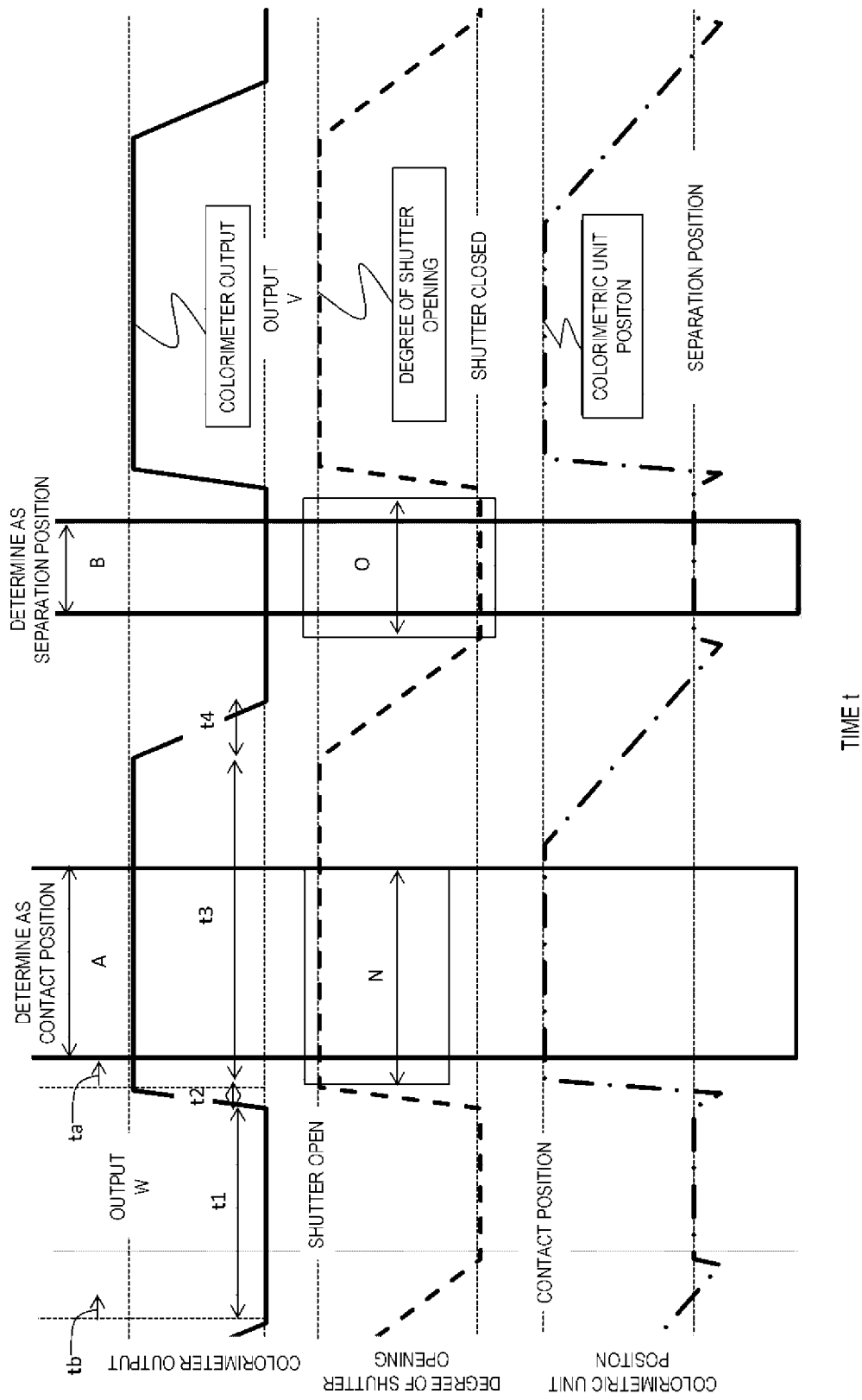
FIG. 20 is diagram showing, on a time axis, a relationship between an output of a colorimeter, a degree of shutter opening, and a position of the colorimetric unit according to the fourth embodiment of the present invention.

FIG. 20 is diagram showing, on a time axis, a relationship between an output of the colorimeter 11, a degree of shutter opening, and a position of the colorimetric unit 10. An abscissa indicates time t, and an ordinate indicates a position of the colorimetric unit 10, a degree of opening of the shutter 14, and an output of the colorimeter 11.

Figure 21:
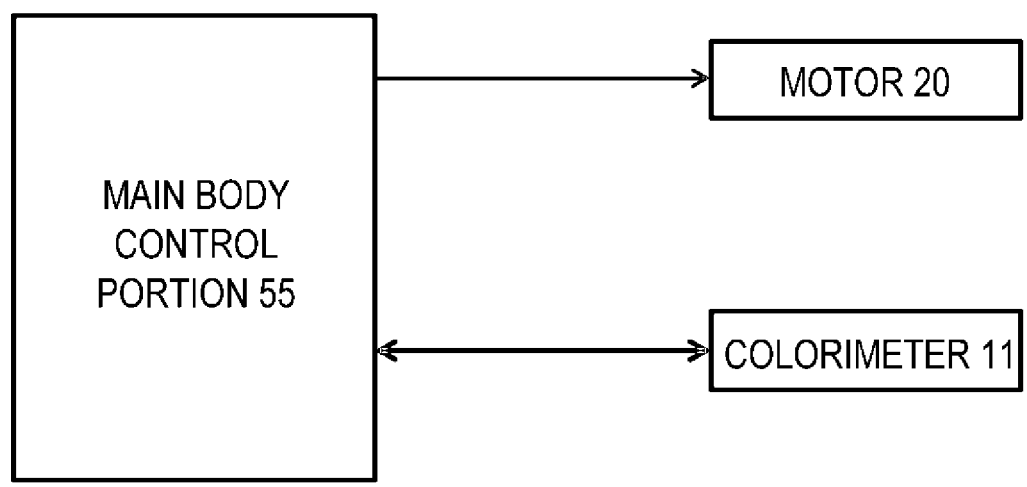
FIG. 21 is a block diagram of motor control according to the fourth embodiment of the present invention.

FIG. 21 is a block diagram of control of the motor 20 according to the present fourth embodiment. FIG. 22 is a flow chart for determining a contact position or a separation position of the colorimetric unit 10 according to the present embodiment.

Depending on a difference in a colorimetric object between when the shutter 14 is open and when the shutter 14 is closed, the colorimeter 11 outputs the first output (a first value) when the shutter 14 is open and outputs the second output (a second value) when the shutter 14 is closed. In other words, in a state where the recording material is absent, the colorimetric object when the shutter 14 is open is an image of the white reference plate 30 that is a reference section provided on the transport surface Da opposite the colorimeter 11. On the other hand, the colorimetric object when the shutter 14 is closed is an image of an opposing section which opposes the colorimeter 11 of the shutter 14.

The first output and the second output are stored in the main body control portion 55 in advance, and the colorimeter 11 is actuated when opening or closing the shutter 14. In addition, a determination that the shutter 14 is open is made when the output of the colorimeter 11 is the first output, and a determination that the shutter 14 is closed is made when the output of the colorimeter 11 is the second output. Alternatively, a determination that the position of the colorimetric unit 10 is the contact position (the first position) is made when the output of the colorimeter 11 is the first output, and a determination that the position of the colorimetric unit 10 is the separation position (the second position) is made when the output of the colorimeter 11 is the second output.

In the present embodiment, black is adopted as a color of the shutter 14. As shown in FIG. 20, since the colorimetric window 11a is closed by the shutter 14 when the colorimetric unit 10 is in the separation state, an output V (the second output) of black which is the color of the shutter 14 is sent to the main body control portion 55 from the colorimeter 11. On the other hand, when colorimetry is performed by the colorimeter 11 when the colorimetric unit 10 is in the contact state or, in other words, in the shutter open state, since the colorimetric window 11a opposes the white reference plate 30, an output W (the first output) of white is sent to the main body control portion 55 from the colorimeter 11. In other words, different outputs are detected by the colorimeter 11 between the shutter closed state and the shutter open state.

Therefore, in the present embodiment, the difference in output obtained by the colorimeter 11 between the shutter closed state and the shutter open state forms a basis of detection of the shutter being open or closed and the colorimetric unit 10 being in contact or separated.

However, simply determining that the shutter 14 is in the closed state and the colorimetric unit 10 is at the separation position when the output is V and determining that the shutter 14 is in the open state and the colorimetric unit 10 is at the contact position when the output is W creates the following problem.

That is, as shown in FIG. 20, since a degree of opening of the shutter 14 and a position and a phase of the colorimetric unit 10 are not consistent with each other, making a determination simply based on output due to the degree of opening of the shutter 14 entails a risk of determining a contact state even in a section denoted by J in FIG. 18. In addition, depending on characteristics of the colorimeter 11, when the colorimetric window 11a is opened by a certain amount, a same output as that when the colorimetric window 11a is fully open may be returned. In other words, there is a risk that the shutter 14 may be determined to be fully open even if it is not.

Control of the main body control portion 55 when the colorimetric unit 10 makes a transition from the separation position to the contact position will now be described with reference to FIGS. 20 and 21.

First, the motor 20 rotates in accordance with a signal from the main body control portion 55.

At this point, since the colorimetric unit 10 is at the separation position, the output V of black is detected as the output of the colorimeter 11. As the motor 20 rotates, the shutter 14 makes a transition to an open state due to the mechanism described earlier. Shortly after the motor 20 starts driving, as shown in FIG. 20, the output W of white is detected as the output of the colorimeter 11. Once ta has elapsed after detecting the output W, the main body control portion 55 determines that the colorimetric unit 10 is reached the contact state and stops the rotation of the motor 20. Meanwhile, the motor 20 is rotated in a similar manner during a movement from the contact position to the separation position, and once tb has elapsed after detecting the output V, the main body control portion 55 determines that the colorimetric unit 10 is reached the separation state and stops the rotation of the motor 20. In the present fourth embodiment, the motor 20 is stopped based on an elapsed time from a time point where the output of the colorimeter 11 becomes W or V instead of an elapsed time from the start of rotation of the motor. This is because, as described earlier, the rotational speed of the motor 20 is not constant. Accordingly, a contact/separation state of the colorimetric unit 10 and opening/closing of the shutter can be reliably detected at low cost.

Control Flow Chart

Figure 22:
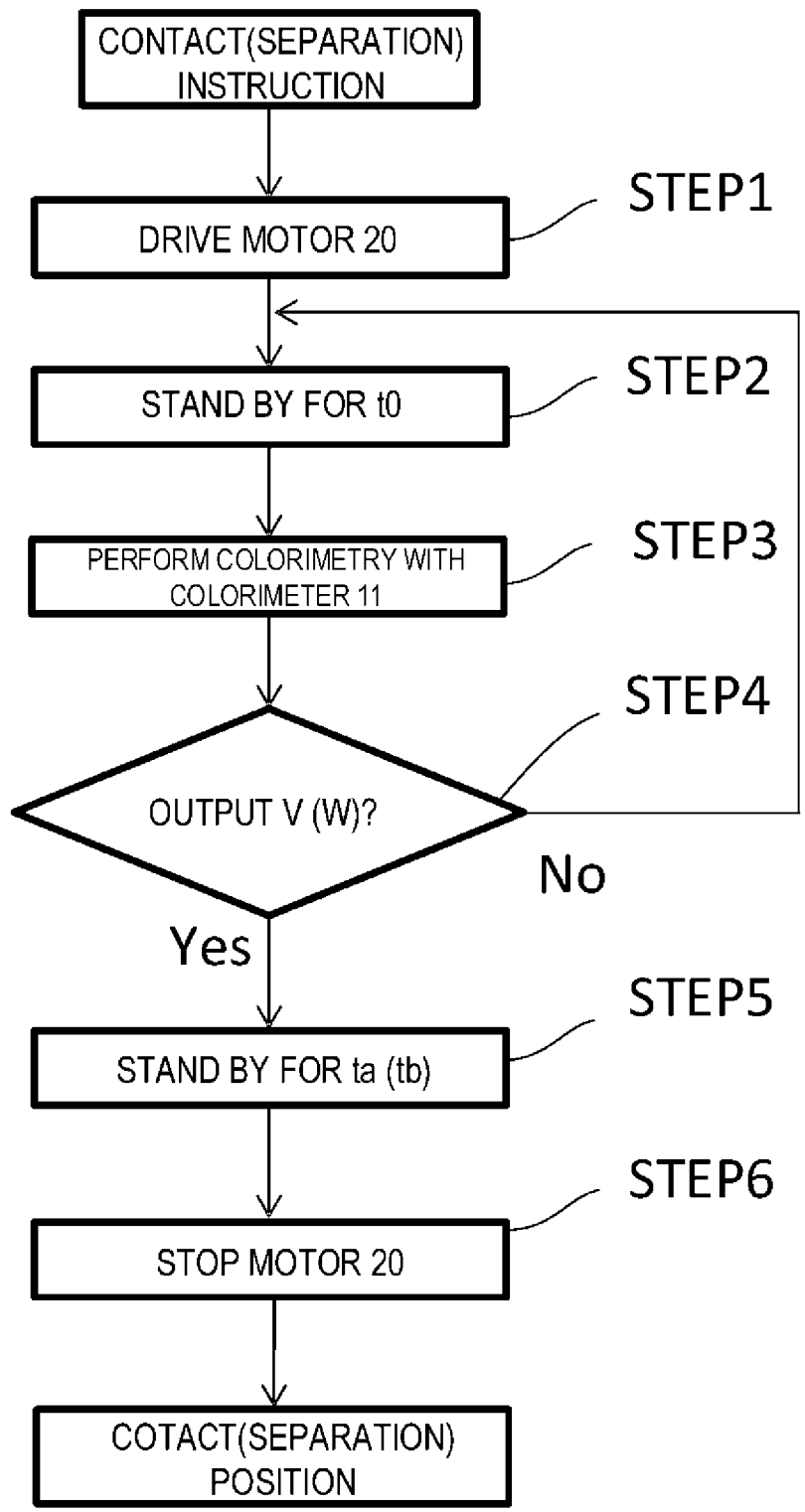
FIG. 22 is a flow chart for determining a contact/separation position of the colorimetric unit according to the fourth embodiment of the present invention.

FIG. 22 shows a control flow chart in the main body control portion 55 according to the present embodiment.

When a contact instruction or a separation instruction is issued, the motor 20 starts driving (STEP 1), and colorimetric operations are consecutively performed by the colorimeter 11 during the driving of the motor 20 (STEPS 2 and 3). The term "consecutive" as used herein refers to performing colorimetric operations by actuating the colorimeter 11 a plurality of times (receiving light a plurality of times) at a short sampling period t0 which enables a variation in output of the colorimeter 11 to be sufficiently detected during an opening/closing operation of the shutter 14.

In addition, in the case of a contact instruction, the colorimetric unit 10 is determined to be at the contact position in a part (a period denoted by A in FIG. 20) of a period in which the output of the colorimeter 11 is W, but the colorimetric operation is repeated when the output is not W (STEP 4). On the other hand, in the case of a separation instruction, the colorimetric unit 10 is determined to be at the separation position in a part (a period denoted by B in FIG. 20) of a period in which the output of the colorimeter 11 is V, but the colorimetric operation is repeated when the output is not V (STEP 4).

Furthermore, in the case of a contact instruction, once to has elapsed after detecting the output W, a determination is made that the colorimetric unit 10 has reached the contact state (STEP 5), and the rotation of the motor 20 is stopped (STEP 6). On the other hand, in the case of a separation instruction, once tb has elapsed after detecting the output V, a determination is made that the colorimetric unit 10 has reached the separation state (STEP 5), and the rotation of the motor 20 is stopped (STEP 6). Accordingly, the colorimetric unit 10 can be positioned at the contact position or the separation position.

Moreover, in the present embodiment, since the shutter open state exists when the colorimetric unit 10 is at the contact position, the shutter open state is not independently detected. When independently detecting the shutter open and closed states, the shutter open state may be determined in a part (a period denoted by N in FIG. 20) of a period in which the output of the colorimeter 11 is W. In addition, the shutter closed state may be determined in a part (a period denoted by O in FIG. 20) of a period in which the output of the colorimeter 11 is V.

In addition, the motor 20 according to the present embodiment has a characteristic in that rotational speed varies in accordance with a load torque as described earlier. The load torque varies in accordance with friction between the contact region 13a of the colorimeter base 13 and the slide cam 15 shown in FIGS. 16A to 16F, biasing pressure of the biasing member 18, the environment, and the like. In addition, the output of the motor 20 and the output of the colorimeter 11 also contain machine difference and environmental variability. Therefore, time represented by the abscissa and output represented by the ordinate in FIG. 20 vary according to circumstances. In consideration thereof, in the present embodiment, an initialization operation is automatically performed before actually performing a contacting/separating operation.

Initialization Operation

Hereinafter, the initialization operation will be described.

The motor 20 is rotated for a certain period of time when power of the image forming apparatus is turned on or before a colorimetric operation is actually performed. This period of time is sufficiently longer than a cycle shown in FIG. 20, and a contacting/separating operation of the colorimetric unit 10 is performed at least once or, in other words, at least for one cycle. The colorimetric operation (at a sampling period of t0) by the colorimeter 11 is consecutively performed during this period, and the main body control portion 55 stores cycles (t1, t2, t3, and t4) of contact/separation and output variations of the outputs V and W that represent amplitudes as shown in FIG. 20 at the time point.

In other words, a time t1 during which the output is V, a transition time t2 from the output V to the output W, a time t3 during which the output is W, and a transition time t4 from the output W to the output V are stored. Based on the stored information on the cycles, ta and tb are determined. For example, ta is set so that the cam gear 17 is reliably stopped during a period where the cam gear phase indicated by the abscissa in FIGS. 15A to 15F ranges from 120 degrees to 270 degrees such as setting 10% of t3 as ta.

In a similar manner, tb is set so that the cam gear 17 is reliably stopped during a period where the cam gear phase indicated by the abscissa in FIGS. 15A to 15F ranges from 0 degrees to 90 degrees. In addition, when the main body control portion 55 stores the outputs W and V which are amplitudes, desirably, a value obtained by cutting a top few percent and a bottom few percent from an actual output amplitude is used as a reference value and outputs exceeding the reference value are respectively adopted as W and V. Accordingly, a colorimetric variation of the colorimeter 11 can be absorbed.

As described above, according to the present embodiment, using a difference between an output of the colorimetric unit 10 when the shutter 14 is open and an output of the colorimetric unit 10 when the shutter 14 is closed, an open/closed state of the shutter 14 can be determined and a contact/separation position of the colorimetric unit 10 can be detected.

Therefore, contact/separation control of the colorimetric unit 10 can be performed without newly adding means for opening/closing detection of the shutter 14 or means for contact/separation detection, and a reduction in cost can be achieved.

Fifth Embodiment

Next, a fifth embodiment of the present invention will be described with reference to FIGS. 23A and 23B.

FIGS. 23A and 23B are enlarged sectional views of a colorimetric apparatus according to the present embodiment.

The fourth embodiment is configured such that the white reference plate 30 is arranged on the colorimetric surface Z opposite the colorimetric unit 10. In contrast, in the present embodiment, the white reference plate 30 is arranged on the back of a shutter 114, and an opposing portion of the colorimetric unit 10 is formed in a color which causes an output that differs from a white reference to be made. Since a drive configuration and control specifications of the colorimetric unit 10 according to the present embodiment are the same as those of the fourth embodiment, same components will be denoted by same reference characters and a description thereof will be omitted.

In the present embodiment, the white reference plate 30 is arranged on the back of the shutter 114. In an aspect in which the shutter 14 is housed inside the colorimetric unit 10 as in the fourth embodiment, a distance to the colorimeter 11 differs between performing colorimetry of the white reference plate 30 and performing colorimetry of the recording material P. Therefore, the present embodiment adopts a configuration in which the shutter 114 is provided outside the colorimetric unit 10, and when the colorimetric unit 10 moves to a contact/separation position, the entire colorimetric unit 10 moves forward or backward so as to straddle the shutter 114.

In the present embodiment, an output of the colorimeter 11 in the case of the white reference plate 30 is W and an output of the colorimeter 11 is V when assuming that an opposing transport surface is black is V, and the diagram of colorimeter output in FIG. 20 according to the fourth embodiment is reversed so that an output portion of W becomes V and an output portion of V becomes W. Therefore, a section of A in which the output is V may be determined as a contact state and a section of B in which the output is W may be determined as a separation state.

As described above, according to the present embodiment, even when the white reference plate 30 is arranged on the back of the shutter 114, a distance between the colorimetric surface Z and the white reference plate 30 and a distance between the colorimetric surface Z and the recording material P can be made the same. Therefore, using a difference between an output of the colorimetric unit 10 when the shutter 114 is open and an output of the colorimetric unit 10 when the shutter 114 is closed, an open/closed state of the shutter 114 can be detected and a contact/separation position of the colorimetric unit 10 can be detected.

Therefore, contact/separation control of the colorimetric unit 10 can be performed without newly adding means for opening/closing detection of the shutter or means for detecting contact/separation positions, and a reduction in cost can be achieved.

Other Embodiments

Although configurations that differ in terms of positional relationships among the colorimeter 11, the shutter (14 or 114), and the white reference plate 30 have been described in the fourth and fifth embodiments, the present invention is not limited thereto and a positional relationship or a configuration which differs from these examples may be adopted.

For example, in the fourth and fifth embodiments, a position of the colorimetric surface Z from the colorimeter 11 is more or less the same in the case of the white reference plate 30 and in the case of the recording material P. However, in a case where a focal length of the colorimeter 11 is variable or a depth of focus has sufficient width, as shown in FIGS. 24A and 24B, a shutter 214 having the white reference plate 30 may be arranged inside the colorimetric unit 10.

In this case, a configuration in which the recording material P is sandwiched as in the first and second embodiments need not necessarily be adopted. For example, a system in which the recording material P is transported along the colorimetric unit 10 as shown in FIG. 24A or a system in which the recording material P is transported along the opposing transport surface Da of the duplex transport path D as shown in FIG. 24B are conceivable.

Figure 24A:
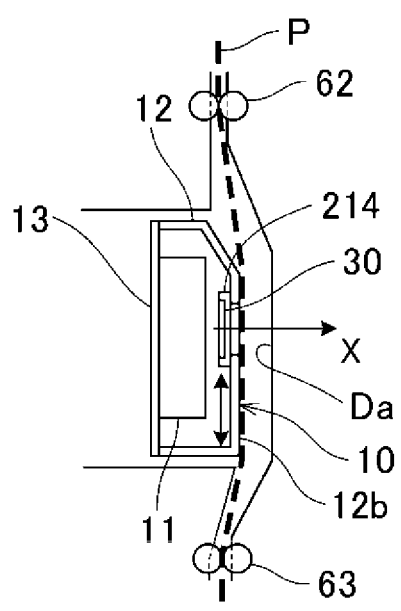
FIGS. 24A and 24B are enlarged sectional views of colorimetric apparatuses according to other embodiments of the present invention.

In other words, in the configuration shown in FIG. 24A, the colorimetric unit 10 is constituted by the colorimeter cover 12 as a cover member which covers the colorimeter 11, and a distance between the recording material P and the colorimeter 11 is kept constant by bringing the colorimeter cover 12 into contact with the recording material P. In addition, the shutter 214 provided with the white reference plate 30 is arranged inside the colorimeter cover 12, the colorimetric unit 10 is fixed without being moved forward or backward with respect to the opposing transport surface Da, and the recording material P is transported along a front surface of the colorimeter cover 12.

Figure 24B:
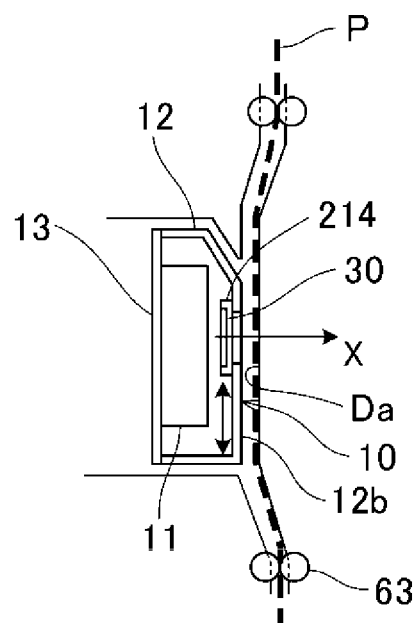

In addition, in the configuration shown in FIG. 24B, the colorimetric unit 10 is constituted by the colorimeter cover 12 as a cover member which covers the colorimeter 11, and the shutter 214 provided with the white reference plate 30 is arranged inside the colorimeter cover 12. The colorimetric unit 10 is fixed without being moved forward or backward with respect to the opposing transport surface Da, and the recording material P is separated from the colorimeter cover 12 and transported along the opposing transport surface Da.

When adopting a system such as those shown in FIGS. 24A and 24B, a contacting/separating operation of the colorimetric unit 10 need no longer be performed, and only detection of opening/closing of the shutter 214 may be performed using output of the colorimeter 11 by control specifications as described in the fourth embodiment. Even in this case, detection can be performed based on a difference in outputs of the colorimeter 11 between the shutter open state and the shutter closed state.

In addition, while the white reference plate 30 is arranged as a reference in the embodiments described above, a reference chart having a reference color for each color may be adopted instead of the white reference plate 30. Furthermore, the reference plate or the reference chart may be omitted as long as performance as a colorimetric unit can be guaranteed. The present invention can be applied in configurations in which an output of a colorimetric apparatus differs between a shutter open state and a shutter closed state.

Moreover, while a colorimetric unit that performs colorimetry of a color patch image has been described as an example of a colorimetric apparatus in the respective embodiments presented above, a colorimetric unit that performs colorimetry of a black and white patch image may be used instead. In addition, the detecting apparatus may be used in a so-called media sensor that is an imaging apparatus which captures an image of surface properties of a recording material and which determines a type of the recording material or the like instead of performing colorimetry of a patch image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-173126, filed on Sep. 8, 2017, and No. 2017-173139, filed on Sep. 8, 2017, which are hereby incorporated by reference herein in their entirety.

What is claimed is:

1. A detecting apparatus for detecting a patch image being fixed on a sheet as a detection material, the detecting apparatus comprising:
 a light emitting element that emits light toward the detection material;
 a light receiving element that receives light reflected from the detection material; and
 an opening/closing member that opens and closes an opening through which light emitted from the light emitting element and light reflected from the detection material pass through,
 wherein the detecting apparatus is capable of moving between a first position and a second position, with the detecting apparatus being more separated from the detection material when the detecting apparatus is in the second position than when the detecting apparatus is in the first position, wherein the detecting apparatus detects the detection material when in the first position and does not detect the detection material when in the second position, and wherein the opening/closing member opens when the detecting apparatus is in the first position and closes when the detecting apparatus is in the second position.

2. The detecting apparatus according to claim 1, wherein the detecting apparatus comes is in contact with the detection material when in the first position and is separated from the detection material when in the second position.

3. The detecting apparatus according to claim 1, wherein the opening/closing member opens in accordance with a movement of the detecting apparatus to the first position and closes in accordance with a movement of the apparatus main body to the second position.

4. The detecting apparatus according to claim 1, further comprising:
- an opening/closing member drive portion that opens and closes the opening/closing member; and
- an apparatus drive portion that moves the detecting apparatus,
- wherein the opening/closing member drive portion and the apparatus drive portion are driven by a single driving source.

5. The detecting apparatus according to claim 1, further comprising:
- an opening/closing member drive portion that opens and closes the opening/closing member; and
- an apparatus drive portion that moves the detecting apparatus,
- wherein the movement of the detecting apparatus and the opening/closing operation of the opening/closing member are independent of each other, and
- wherein the opening/closing member drive portion and the apparatus drive portion are driven by different driving sources.

6. The detecting apparatus according to claim 4, wherein the apparatus drive portion includes:
- a biasing member that biases the detecting apparatus in a contact direction of the first position; and
- a cam mechanism that causes the detecting apparatus to reciprocate between the first position and the second position,
- wherein, when the detecting apparatus is in the first position, the detecting apparatus is pressed toward the detection material by the biasing member, and
- wherein, when the detecting apparatus is in the second position, the detecting apparatus is held at the second position by the cam mechanism against a pressing force of the biasing member.

7. The detecting apparatus according to claim 6, wherein the cam mechanism has a slide cam that operates in a direction perpendicular to a direction of operation of the detecting apparatus, and
- wherein the cam mechanism has a rotating cam which is rotationally driven by the driving source and which linearly drives the slide cam, and the cam mechanism having an idle period in which drive is not transmitted to the slide cam from the rotating cam after the detecting apparatus arrives at the first position or the second position.

8. The detecting apparatus according to claim 7, wherein the rotating cam is given rotational drive only in one direction from the driving source.

9. The detecting apparatus according to claim 4, wherein the opening/closing member is biased in one of an opening direction and a closing direction, and the opening/closing member drive portion performs driving only in an opposite direction to a biasing direction of the opening/closing member.

10. The detecting apparatus according to claim 9, wherein the opening/closing member is biased in the opening direction by the opening/closing member's own weight, and
- wherein (i) the opening/closing member drive portion performs driving only in a direction in which the opening/closing member is closed or (i) the opening/closing member is biased by a biasing member that biases the opening/closing member.

11. The detecting apparatus according to claim 1, further comprising:
- a control portion that controls movement of the detecting apparatus and opening/closing of the opening/closing member,
- wherein the light receiving element is configured to output a first output when the opening/closing member is open and output a second output, which differs from the first output, when the opening/closing member is closed, and
- wherein the control portion determines that the opening/closing member is open when the first output is output and determines that the opening/closing member is closed when the second output is output.

12. The detecting apparatus according to claim 11, wherein the control portion receives light reflected from the detection material a plurality of times by the light receiving element during an opening/closing operation of the opening/closing member, determines that the opening/closing member is open in a period of a prescribed portion of a period during which the light receiving element outputs the first output, and determines that the opening/closing member is closed in a period of a prescribed portion of a period during which the light receiving element outputs the second output.

13. The detecting apparatus according to claim 1, wherein the detection material is transported along a transport path inside an image forming apparatus, and
- wherein the detecting apparatus comes into contact with the detection material being transported in the transport path when the detecting apparatus is in the first position.

14. The detecting apparatus according to claim 1, wherein the detection material is transported along a transport path inside an image forming apparatus, and
- wherein the detecting apparatus is separated from the detection material being transported in the transport path when the detecting apparatus is in the second position, and the detection material is transported along a transport surface opposite thereto.

15. The detecting apparatus according to claim 11, wherein the opening/closing member opens in accordance with a movement of the detecting apparatus to the first position and closes in accordance with a movement of the apparatus main body to the second position, and
- wherein the control portion determines that the detecting apparatus is in the first position when the first output is output and determines that the detecting apparatus is in the second position when the second output is output.

16. The detecting apparatus according to claim 15, wherein the control portion receives light reflected from the detection material a plurality of times by the light receiving element during an opening/closing operation of the opening/closing member, determines that the detecting apparatus is in the first position in a period of a prescribed portion of a period during which the light receiving element outputs the first output, and determines that the detecting apparatus is in the second position in a period of a prescribed portion of a period during which the light receiving element outputs the second output.

17. The detecting apparatus according to claim 11, wherein before detecting the detection material, the control portion performs an opening/closing operation of the opening/closing member at least once, and stores a cycle of output variation of the light receiving element.

18. The detecting apparatus according to claim 1, wherein the detecting apparatus is provided with a dispersing unit for dispersing light reflected from the detection material and the light receiving element receives the dispersed light from the dispersing unit.

19. The detecting apparatus according to claim 18, wherein a reference section used as a reference when performing colorimetry of the patch image is provided before performing colorimetry of the patch image, and
wherein the reference section outputs the first output in a portion detected by the light receiving element when the opening/closing member is open or the reference section outputs the second output in a portion detected by the light receiving element when the opening/closing member is closed.

20. The detecting apparatus according to claim 1, wherein the light receiving element is a sensor which images surface properties of the detection material and which is used as an imaging apparatus for determining a type of the detection material.

21. An image forming apparatus comprising:
an image forming unit forming an image on a sheet, and
the detecting apparatus according to claim 1,
wherein a condition of an image formation of the image forming unit is controlled according to a detection result of the detecting apparatus.

* * * * *